US009448650B2

(12) United States Patent
Rogers et al.

(10) Patent No.: US 9,448,650 B2
(45) Date of Patent: Sep. 20, 2016

(54) DISPLAY DEVICE FOR PUNCHING OR PRESSING MACHINES

(71) Applicant: Wilson Tool International Inc., White Bear Lake, MN (US)

(72) Inventors: Bryan L. Rogers, Forest Lake, MN (US); Brian J. Lee, Elk River, MN (US)

(73) Assignee: Wilson Tool International Inc., White Bear Lake, MN (US)

( * ) Notice: Subject to any disclaimer, the term of this patent is extended or adjusted under 35 U.S.C. 154(b) by 766 days.

(21) Appl. No.: 13/673,662

(22) Filed: Nov. 9, 2012

(65) Prior Publication Data

US 2014/0132720 A1 May 15, 2014

(51) Int. Cl.
| | | |
|---|---|---|
| *B21D 5/00* | (2006.01) | |
| *G06F 3/041* | (2006.01) | |
| *H04N 13/02* | (2006.01) | |
| *H05K 5/00* | (2006.01) | |
| *B21D 5/02* | (2006.01) | |
| *B30B 15/14* | (2006.01) | |
| *G05B 19/409* | (2006.01) | |
| *B30B 15/00* | (2006.01) | |

(52) U.S. Cl.
CPC .............. *G06F 3/041* (2013.01); *B21D 5/004* (2013.01); *B21D 5/02* (2013.01); *B30B 15/0094* (2013.01); *B30B 15/148* (2013.01); *G05B 19/409* (2013.01); *H04N 13/0203* (2013.01); *H05K 5/0017* (2013.01); *G05B 2219/45137* (2013.01)

(58) Field of Classification Search
CPC ................................ G06F 3/041; B21D 5/004
USPC .......................................................... 348/46
See application file for complete search history.

(56) References Cited

U.S. PATENT DOCUMENTS

| | | | |
|---|---|---|---|
| 4,399,675 A | 8/1983 | Erdmann et al. | |
| 4,651,601 A * | 3/1987 | Sasaki ................... | B21D 28/12 700/178 |
| 5,983,688 A | 11/1999 | Anzai et al. | |
| 5,995,179 A | 11/1999 | Tamura et al. | |
| 6,026,351 A * | 2/2000 | Takeuchi ............... | G01B 21/02 33/503 |
| 6,163,946 A * | 12/2000 | Pryor ................... | A01B 69/008 29/407.04 |
| 7,325,428 B2 | 2/2008 | Bruggink | |
| 7,392,678 B2 | 7/2008 | Niwa et al. | |

(Continued)

FOREIGN PATENT DOCUMENTS

| | | |
|---|---|---|
| CN | 101035636 A | 9/2007 |
| JP | 2000015340 A | 1/2000 |

(Continued)

OTHER PUBLICATIONS

International Search Report and Written Opinion for International Application No. PCT/US2013/068414, mailed May 23, 2014, 27 pages.

*Primary Examiner* — Jeffery Williams
(74) *Attorney, Agent, or Firm* — Fredrikson & Byron P.A.

(57) ABSTRACT

A display device for punching and/or pressing machines. The display device can be constructed to be modular and of compact size so as to be positioned as desired on new and existing machine designs. The display device is formed with displays, which are configurable to provide a plurality of qualitative and quantitative information. The display device can be configured to be function with consoles of punching and pressing machines so as to be one or more of a supplemental device, an interfacing device, and an interactive device.

43 Claims, 19 Drawing Sheets

(56) References Cited

U.S. PATENT DOCUMENTS

| | | |
|---|---|---|
| 7,513,135 B2 | 4/2009 | Denkmeier |
| 7,913,533 B2 | 3/2011 | Lee |
| 2002/0092333 A1* | 7/2002 | Lindstrom ............ B21D 5/002 72/19.4 |
| 2004/0206145 A1* | 10/2004 | Akami .................... B21D 5/02 72/31.1 |
| 2006/0082518 A1 | 4/2006 | Ram |
| 2011/0178629 A1* | 7/2011 | Diehl ............... G05B 19/40937 700/187 |
| 2012/0290121 A1* | 11/2012 | Gronbach ............ G05B 19/409 700/180 |
| 2013/0015596 A1* | 1/2013 | Mozeika ................ B25J 9/0084 264/40.1 |

FOREIGN PATENT DOCUMENTS

| | | | |
|---|---|---|---|
| JP | 2000176552 A | 6/2000 | |
| JP | 2005177824 A | 7/2005 | |
| JP | 2005288534 A | 10/2005 | |
| JP | 2006289455 A | 10/2006 | |
| JP | 2006346706 A | 12/2006 | |
| JP | 2006289455 A1 * | 8/2011 | ............... B21D 5/02 |

\* cited by examiner

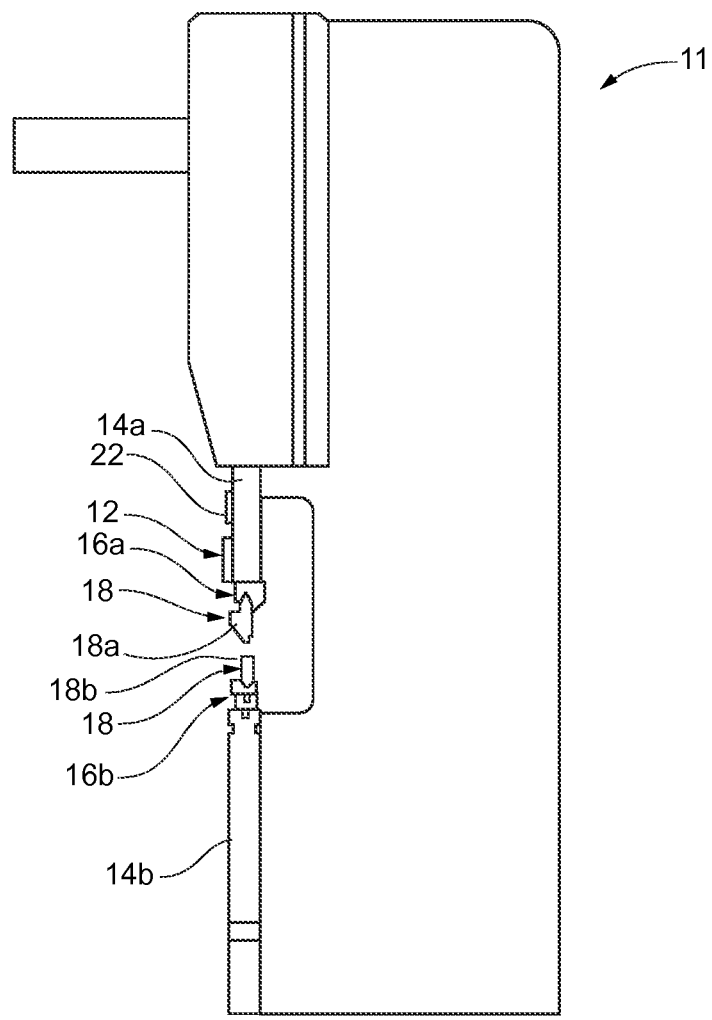

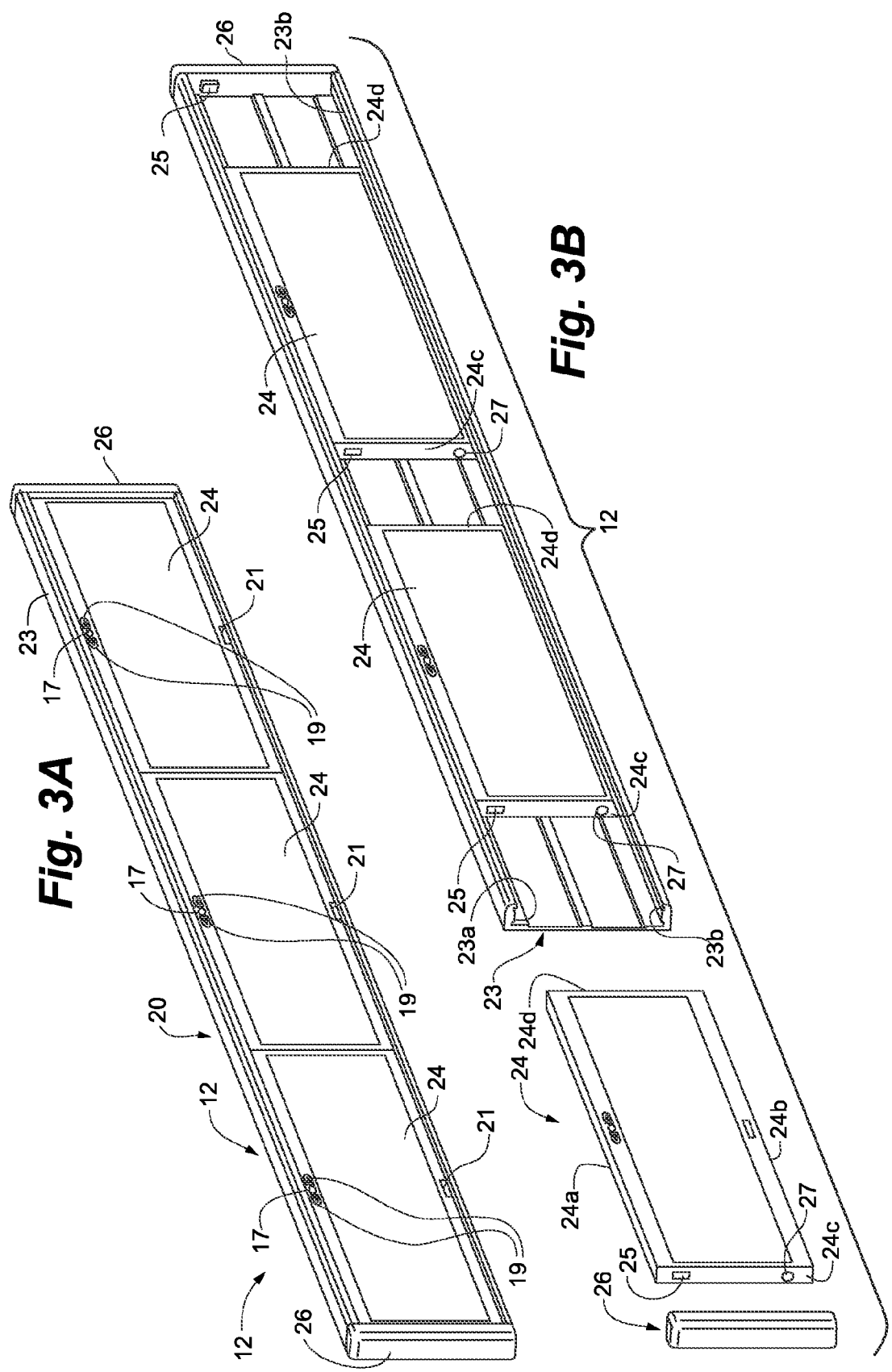

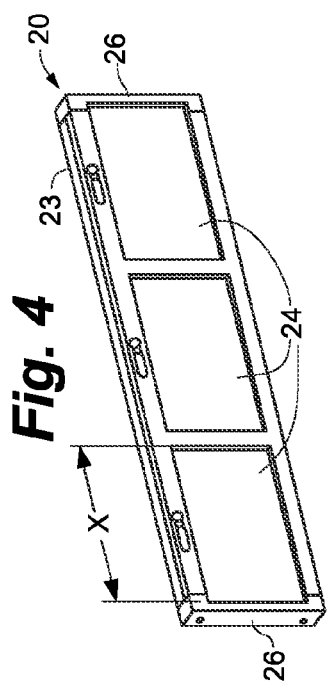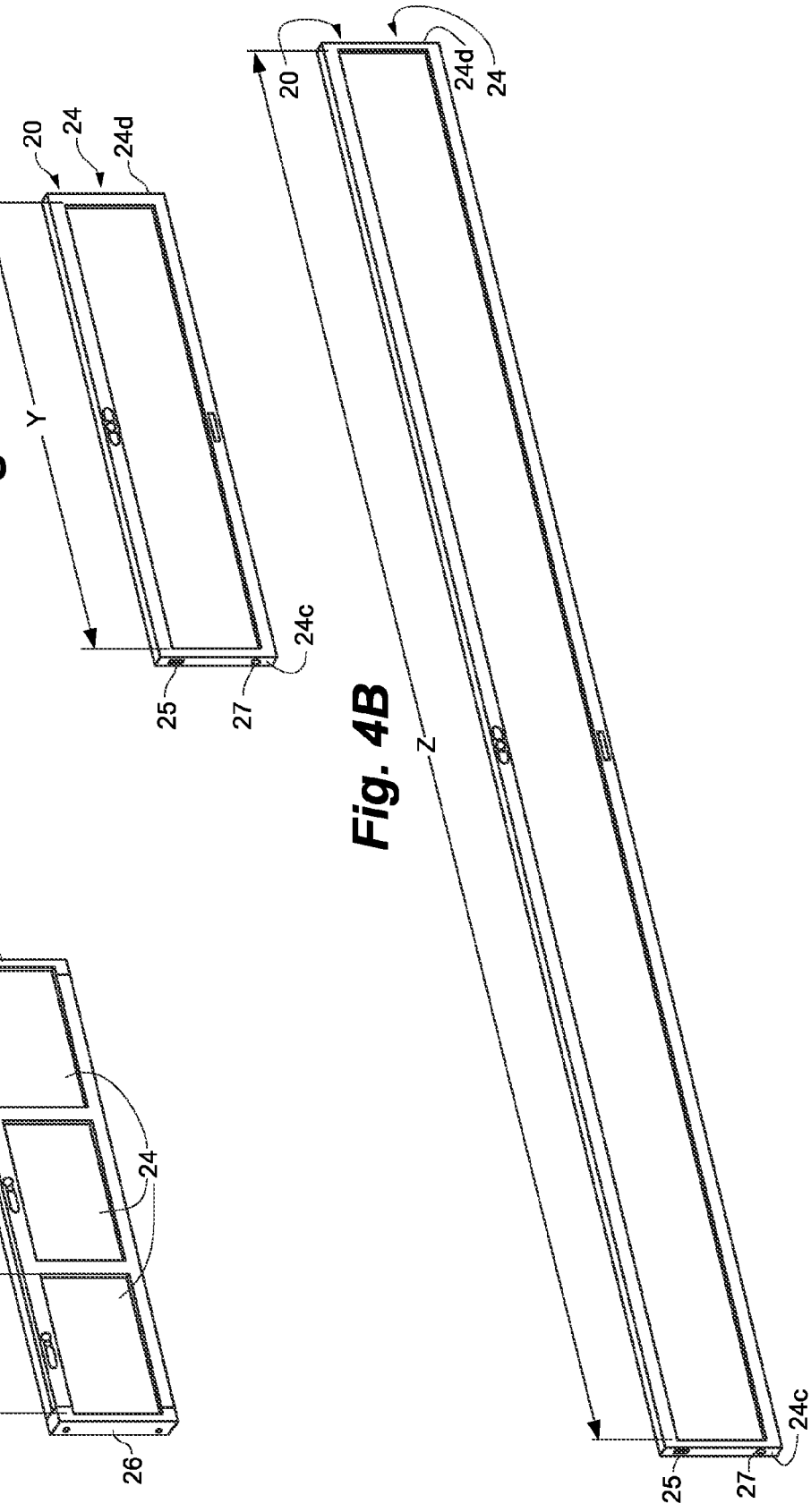

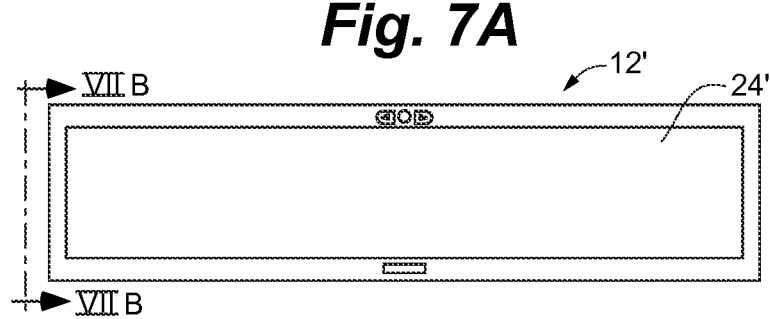
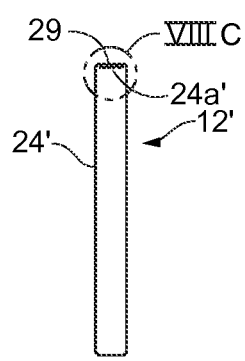
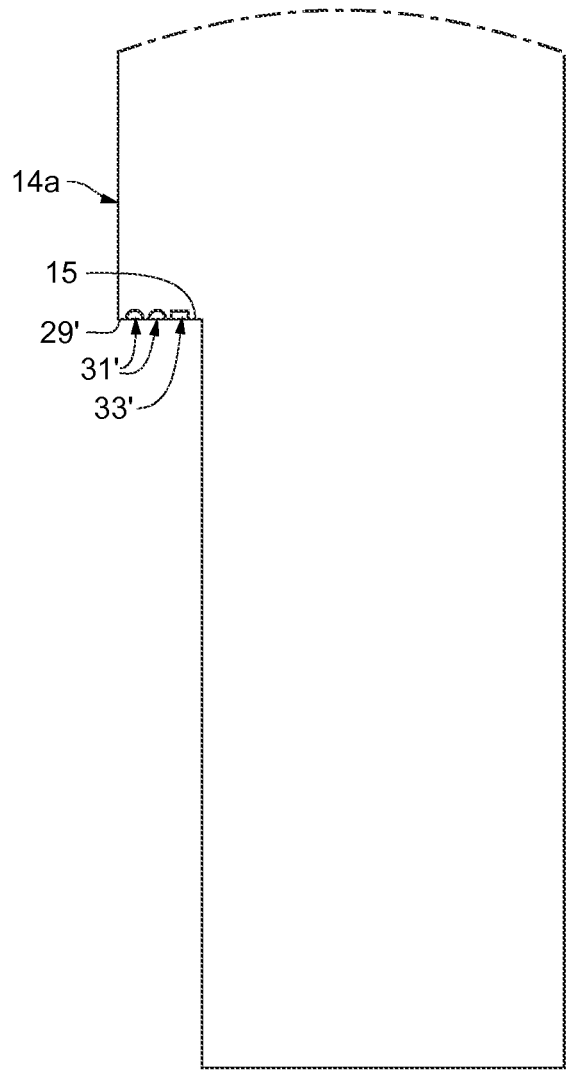
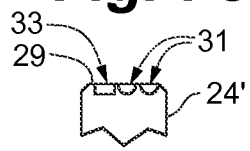

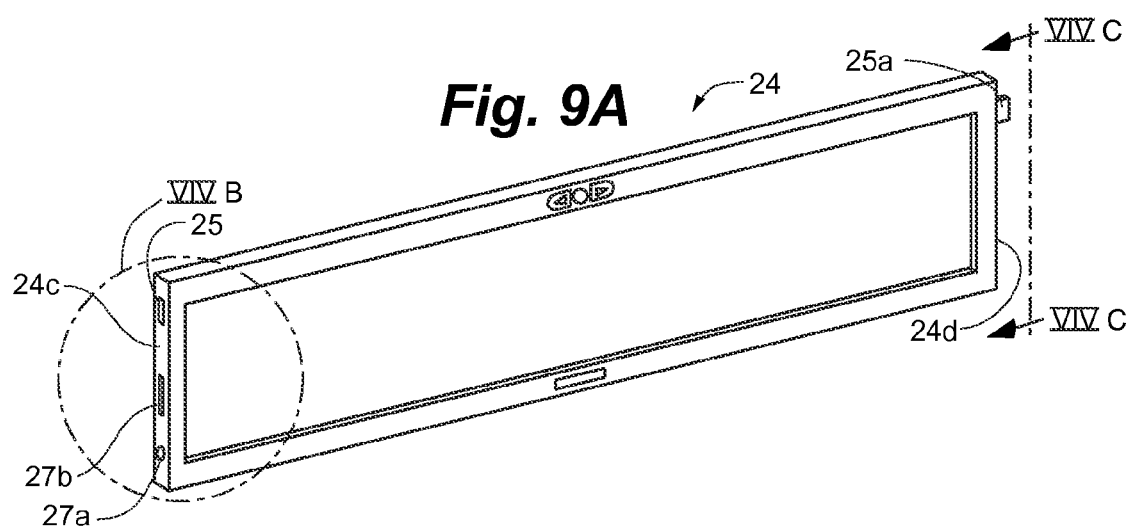
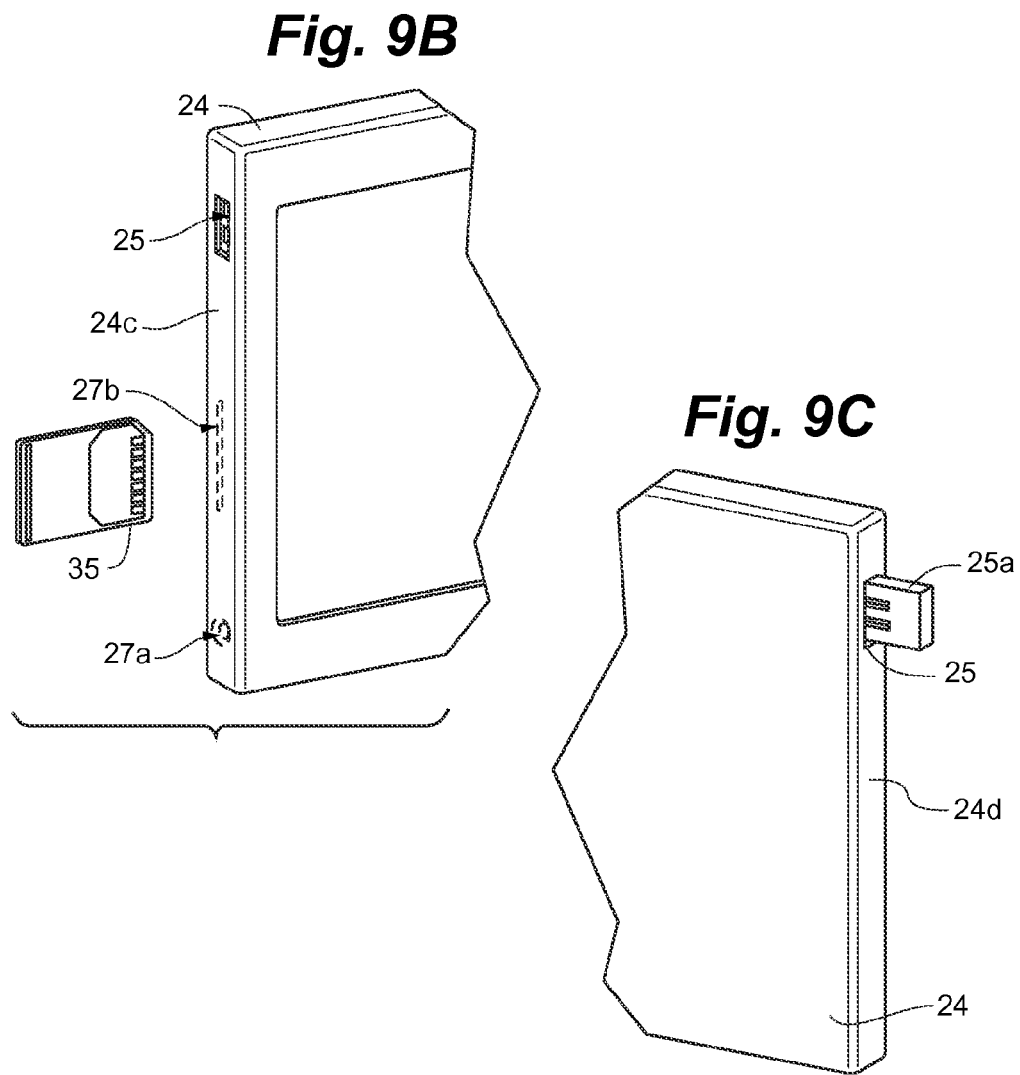

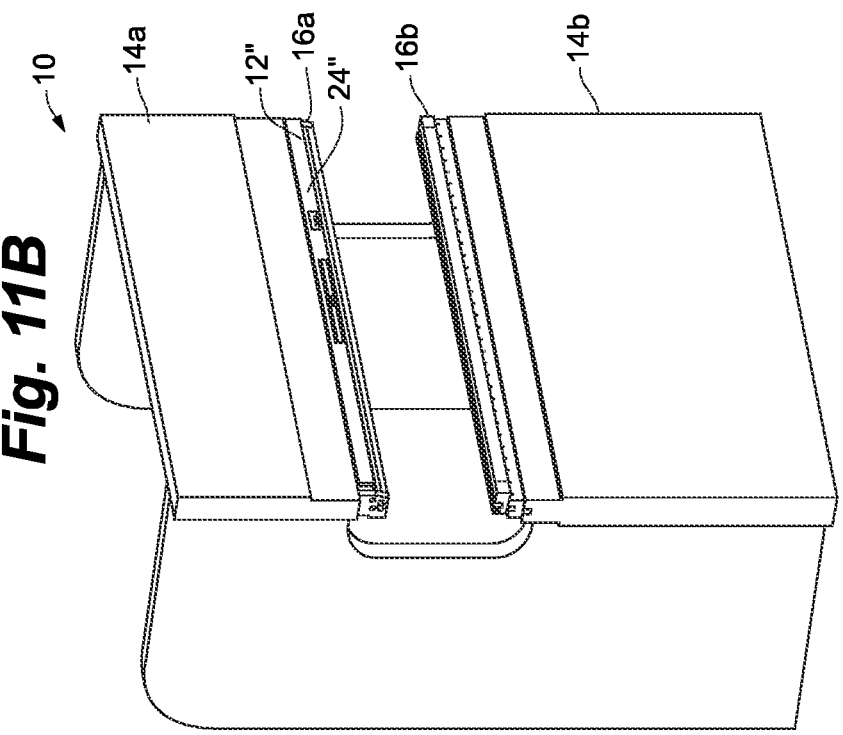
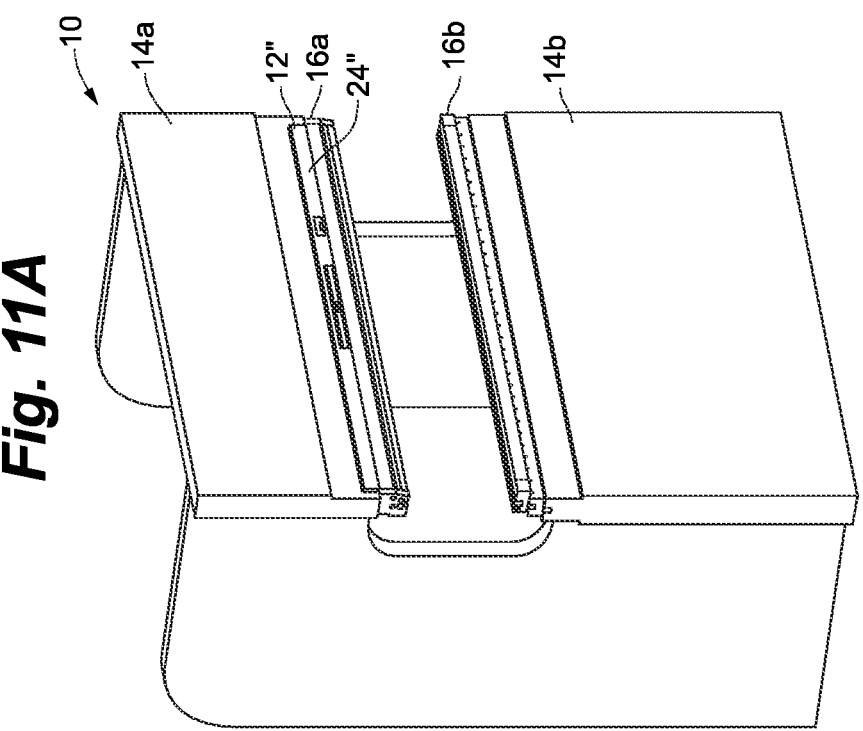

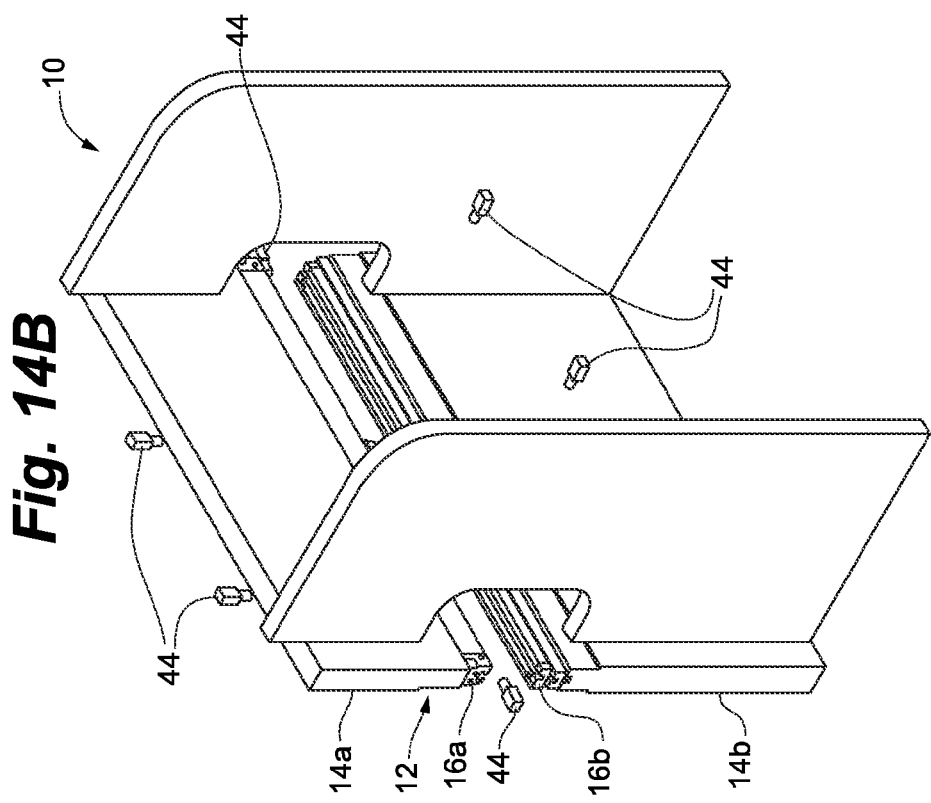
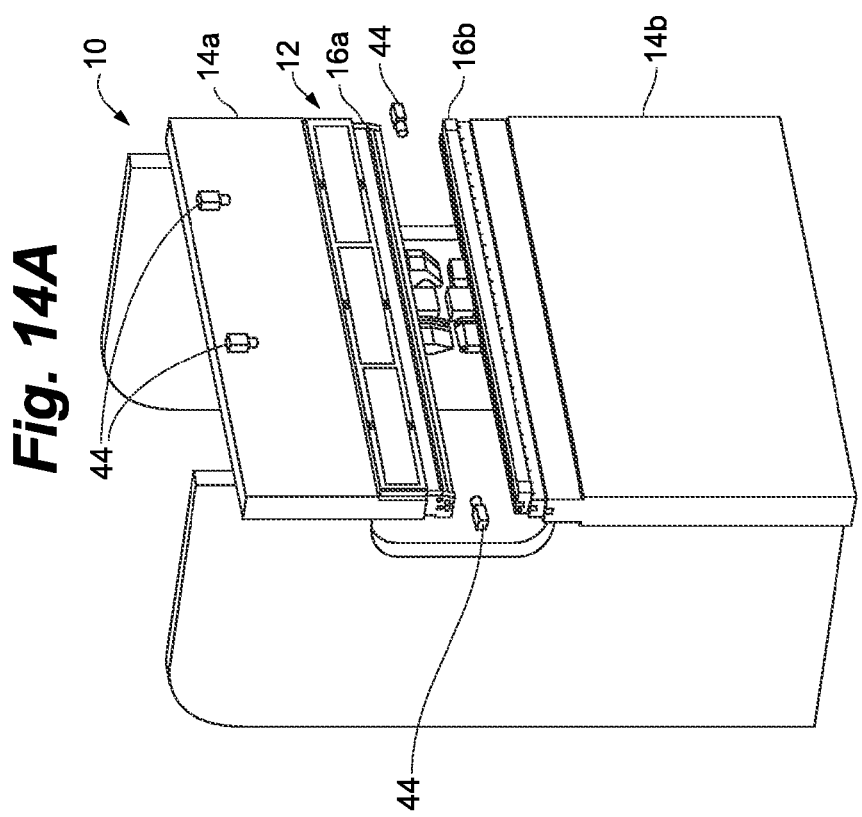

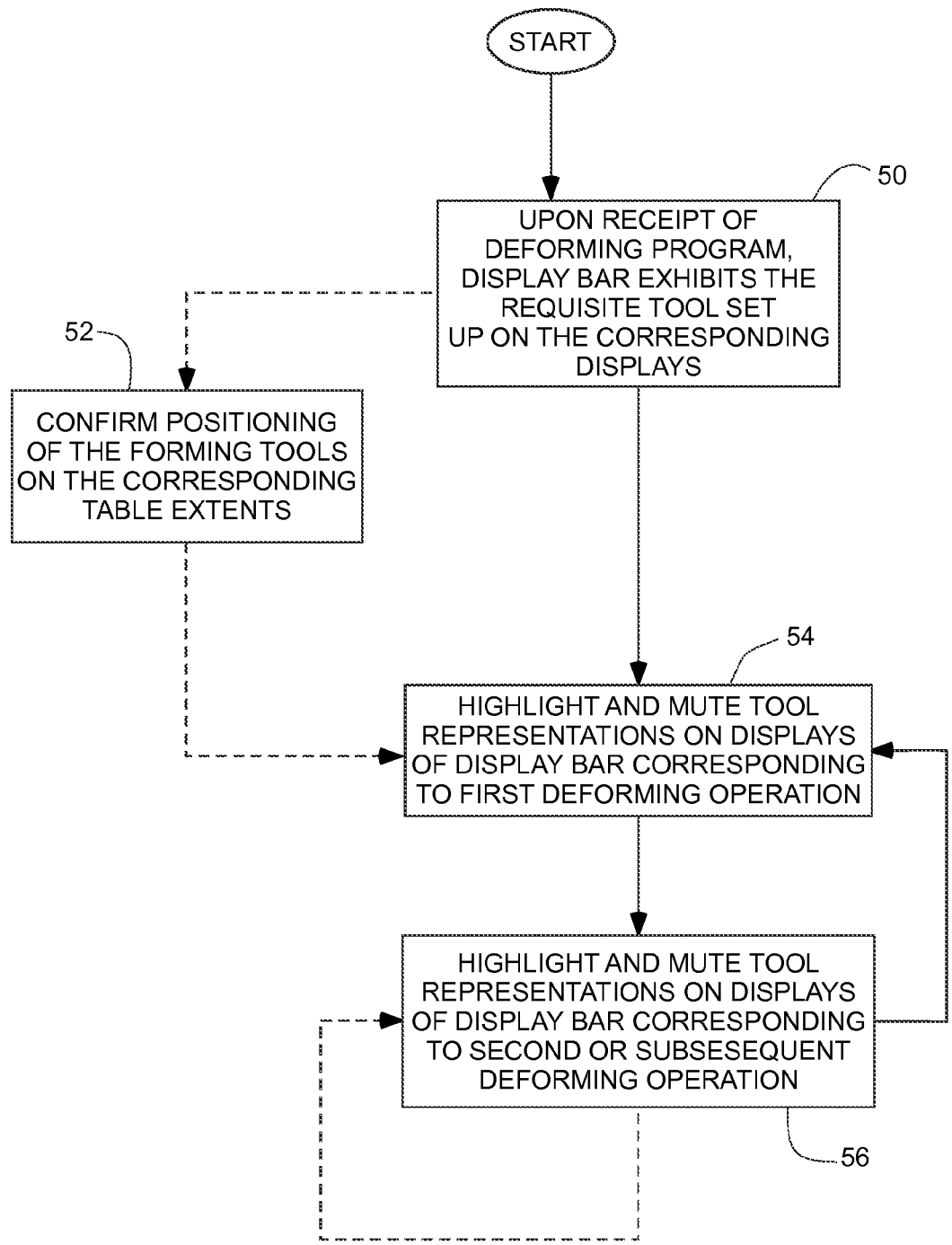

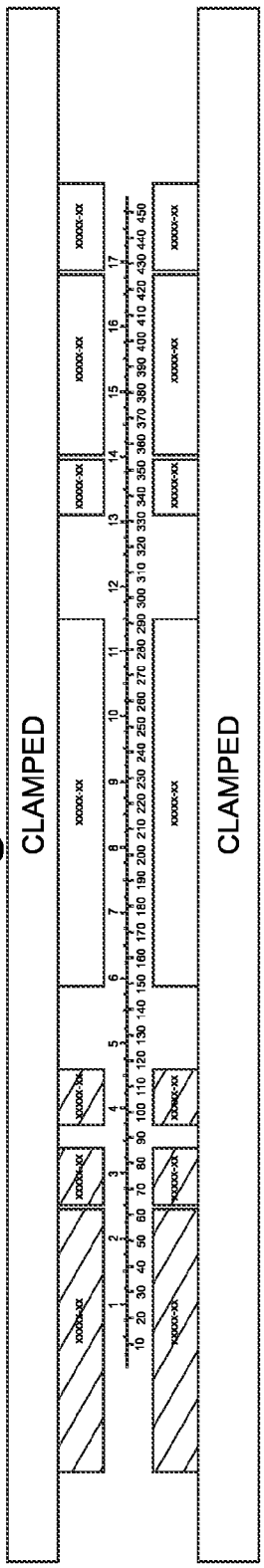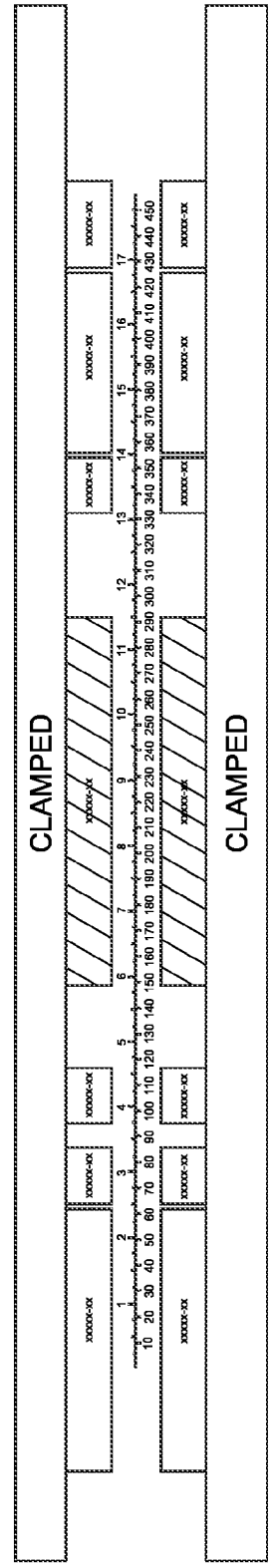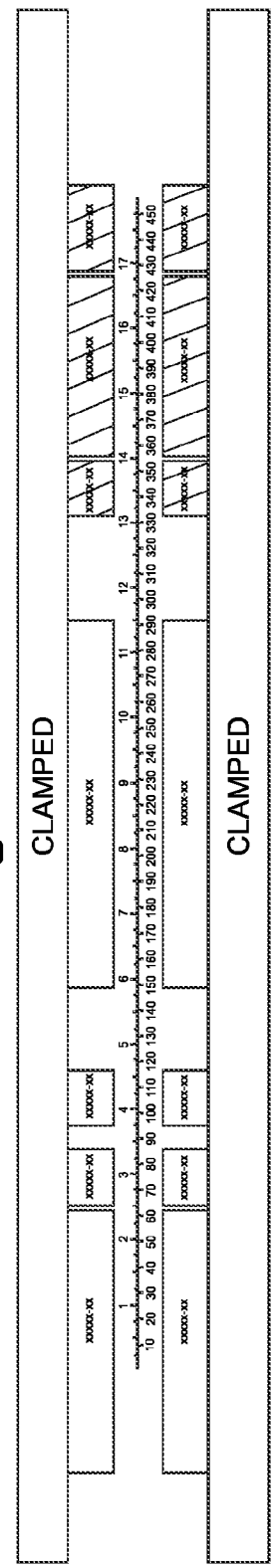

DISPLAY DEVICE FOR PUNCHING OR PRESSING MACHINES

FIELD OF THE INVENTION

The present invention relates generally to apparatus, systems, and methods for aiding machine processes, and more particularly, for aiding processes for punching or pressing machines.

BACKGROUND

Sheet metal and other workpieces can be fabricated into a wide range of useful products. To that end, the fabrication (i.e., manufacturing) processes commonly involve making various bends and/or forming holes in the sheet metal and other workpieces. The types of equipment generally used in such processes include turret presses and other industrial presses (such as single-station presses), Trumpf style machine tools and other rail type systems, press brakes, sheet feed systems, coil feed systems, and other types of fabrication equipment adapted for punching or pressing sheet materials.

Concerning press brakes, they are equipped with a lower table and an upper table, and are commonly used for deforming metal workpieces. One of the tables (typically the upper table) is configured to be vertically movable toward the other table. To that end, forming tools are mounted to the tables so that when one table is brought toward the other, a workpiece positioned there between can be bent into an appropriate shape. Typically, the upper table includes a male forming tool (a punch) having a bottom workpiece-deforming surface (such as a V-shaped surface), and the bottom table has an appropriately-shaped female tool (a die) having an upper surface vertically aligned with the workpiece-deforming surface of the male tool.

As is known, the forming tools used with press brakes must be carefully positioned on the press tables in order to bend the workpiece to precise specifications. To aid the operator in this regard, certain press brakes have been fabricated with positioning systems. Such positioning systems, in many cases, are provided on a front side of the press brake, and span a considerable length of the tables of the press brake. The positioning systems have been known to utilize rulers or scales (e.g., which can be illuminated from behind) or light-emitting diode (LED) mechanisms, such an LED strip. For example, in the case of LED strips, they are typically contained within an enclosure mounted on the press brake, wherein such strip spans an extent of the enclosure and is visible through a clear substrate (such as glass or plastic) on a front side of the enclosure.

In some conventional processes, deforming parameters for a press brake operation are generally entered into a computer console that is hard wired to the press brake. For press brakes having a positioning system as described above, the console is similarly wired thereto. As such, once a machine operation is entered into the press brake console, the positioning system is used to illuminate corresponding segments (of the LED strip or ruler/scale) to indicate requisite mounting positions (e.g., particular locations along a length of the table) for forming tools on the press brake.

While the above-described positioning systems and other conventional types have been of use for positioning forming tools on press brakes, the designs of such systems have limited their use and further functionality. The present invention addresses these and other limitations.

SUMMARY OF THE INVENTION

Embodiments of the invention include focusing on a position, information, and interactive display device (PI-IDD) for punching and/or pressing machines. The display device can be constructed to be modular and of compact size so as to be positioned as desired on new and existing machine designs. The display device is formed with displays, which are configurable to provide a plurality of qualitative and quantitative information. The display device can be configured to be function with consoles of punching and pressing machines so as to be one or more of a supplemental device, an interfacing device, and an interactive device.

In certain embodiments of the invention, a display device for a press brake is provided. The display device comprises one or more displays. The one or more displays are configured for selective positioning and attachment on a front surface of a press brake. The one or more displays have an extent similar in length to extents of upper and lower tables of the press brake. The one or more displays have a depth less than depths of either of the upper and lower tables by at least one fourth.

Additionally, in certain embodiments of the invention, a display device for a press brake is provided. The display device comprises a plurality of displays. The displays are joined in end-to-end fashion and have an extent similar in length to extents of upper and lower tables of a press brake. The displays are capable of being electrically linked and synched so as to collectively exhibit extents of clamping beams on the upper and lower tables. The extents correspond to positions of the displays relative to the beams.

Also, a display device for a press brake is provided. The display device comprises a plurality of displays and a plurality of segments. At least one of the one or more displays is housed within each of the segments. The segments are joined in end-to-end fashion and have an extent similar in length to extents of upper and lower tables of a press brake. The joined segments form a modular assembly.

Also, in certain embodiments of the invention, a system for conveying information relating to operations for punching and pressing machines is provided. The system comprises a punching or pressing machine, a display device, and a console. The display device is configured to be selectively positioned and used on the machine. The display bar has one or more displays having touch screen functionality. The one or more displays are configured to exhibit quantitative and qualitative information. The quantitative and qualitative information comprises detail and characteristics involving one or more of programmed operations for the machine and tools therefor. The console is located remote from the display bar. The quantitative and qualitative information is provided to the display bar via the console.

Further, in certain embodiments of the invention, a method is provided for a display device of a press brake during a bending operation involving multiple deforming operations. The method comprises a step of exhibiting a tool set up on one or more displays of the display device. The tool set up corresponds to a specific bending program received by the display device. The exhibited tool set comprises quantitative and qualitative information for upper and lower tables of the press brake and forming tools to be used on the tables for the bending program. The qualitative information comprises corresponding representations of the upper and lower tables and the forming tools. The quantitative information comprises proper positions of the tools on the upper and lower tables. The method comprises another step, for a first deforming operation of the specific bending program for a first workpiece, of emphasizing the tool representations associated with the first deforming operation and deemphasizing the tool representations not associated with the first deforming operation. The method comprises another step, for a second deforming operation of the specific bending program for the first workpiece, of deemphasizing the tool representations associated with the first deforming operation and emphasizing the tool representations associated with the second deforming operation. The method comprises another step of repeating the deemphasizing and the emphasizing steps with reference to the second deforming operation for any further deforming operations of the specific bending program for the first workpiece. The method comprises a further step of repeating the emphasizing and deemphasizing steps with regard to the first deforming operation, second deforming operation, and as applicable, further deforming operation(s) for any further workpieces to be made per the bending program.

DESCRIPTION OF THE DRAWINGS

FIG. 2 is a side elevation view of a press brake and the display device of FIG. 1;

FIGS. 3A and 3B show enlarged perspective and assembly views of the display device of FIG. 1;

FIG. 4 shows perspective views of three exemplary segments having varied extents and configurations for display devices in accordance with certain embodiments of the invention;

FIGS. 7A-7C are front, side, and enlarged side elevation views of another display device in accordance with certain embodiments of the invention;

FIG. 8 is a side elevation view of a upper press beam for a press brake in accordance with certain embodiments of the invention;

FIGS. 9A-9C are perspective views, whole and in part, of a display of the display device of FIG. 1;

FIGS. 11A and 11B show perspective views of the press brake of FIG. 1 with a further display device in accordance with certain embodiments of the invention;

FIGS. 14A and 14B show front and rear perspective views of the press brake and display device of FIG. 1 including cameras surrounding deforming area of the press brake in accordance with certain embodiments of the invention;

FIG. 15 is a flowchart of steps of a method in using the display device in accordance with certain embodiments of the invention;

FIGS. 17A-17C are exemplary screen shots of a display of the display device of FIG. 1, corresponding to steps of the method of FIG. 15.

DETAILED DESCRIPTION

Figure 1:
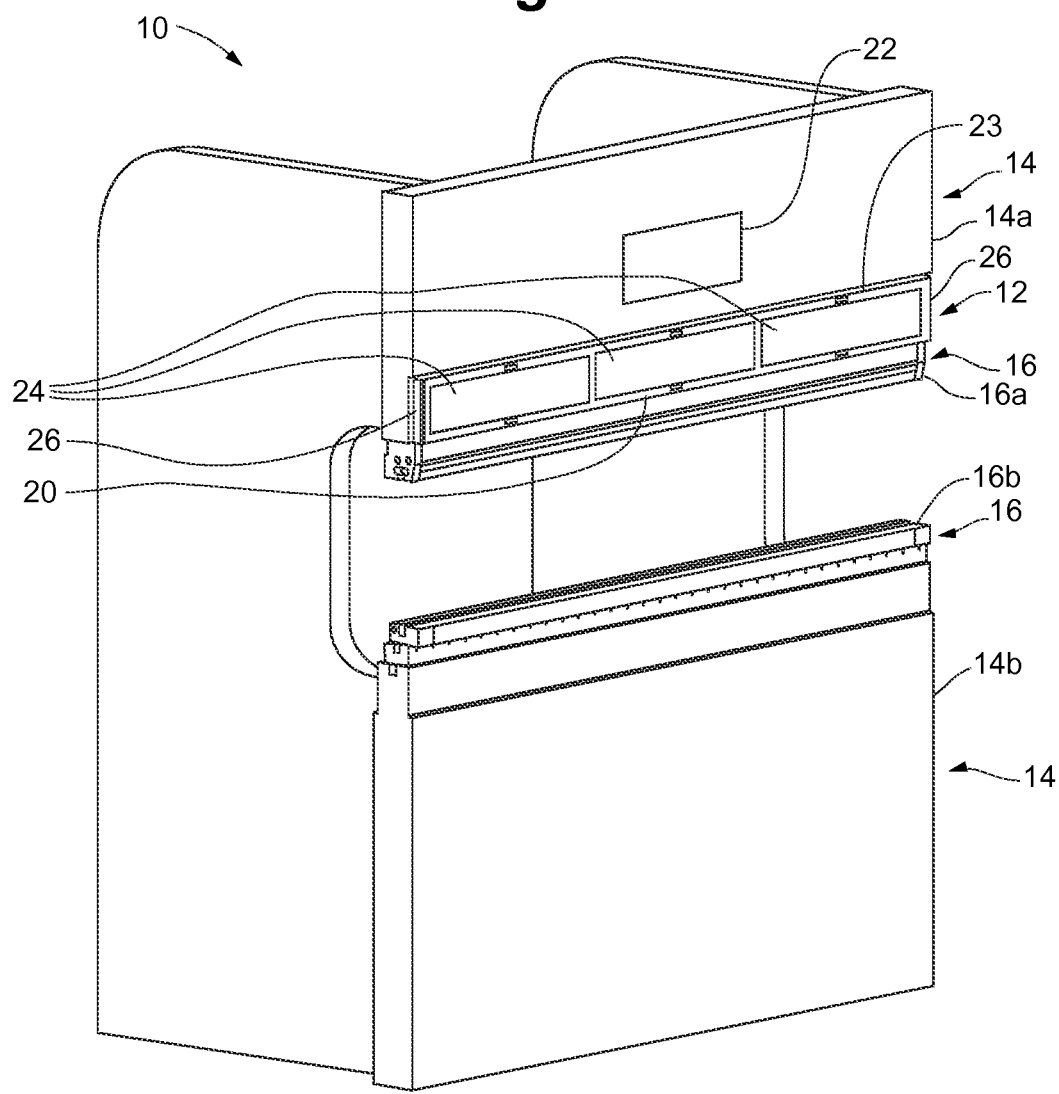
FIG. 1 is a perspective view of a representative press brake including a display device in accordance with certain embodiments of the invention.

The following detailed description should be read with reference to the drawings, in which like elements in different drawings are numbered identically. The drawings depict selected embodiments and are not intended to limit the scope of the invention. It will be understood that embodiments shown in the drawings and described below are merely for illustrative purposes, and are not intended to limit the scope of the invention as defined in the claims.

As described above, certain punching or pressing machine types (such as down-acting or up-acting press brakes) have been configured with positioning systems. For example, with regard to press brakes, the positioning systems have been used to indicate mounting positions for forming tools on the press tables; however, the designs of these systems have availed little other information, such as quantitative data, to be conveyed to the operator. This is due in part to limitations of the mechanisms used with the positioning systems, such as LED strips or rulers/scales. To that end, LED strips or rulers/scales, by their very nature (and particularly when configured to span an extent of press brake tables) are geared for providing measurement information. Thus, even if desired, there is little possibility of expanding the functionality of these positioning systems without significantly altering (e.g., adding to) their designs and constructions. However, the sizes of these conventional positioning systems can already be problematic, in terms of impeding certain machining operations due to clearance issues with regard to workpieces. These are just some of the shortcomings which embodiments of the present invention are intended to address. To that end, embodiments described herein focus on display devices, for example, position, information, and interactive display devices (PIIDDs). While this description focuses on press brake designs, it should be understood that the embodied display devices are applicable for use on virtually any pressing or punching machinery.

FIG. 1 shows a perspective view of a representative press brake 10 with a display device 12 mounted thereon, in accordance with certain embodiments of the invention. Conversely, FIG. 2 shows a side elevation view of a press brake 11 and the display device 12 of FIG. 1. As described above, while FIG. 1 shows a representative press brake 10, it is sufficient for effectively depicting one configuration of the display device 12 and an exemplary mounting location for the device 12 on the press brake 10. To that end (and as later described), the display device 12 shown in FIG. 1 can be representative of a single segment 20 of a display device of the invention used on a press brake of longer extent.

With continued reference to FIG. 1, the display device 12 involves a bar-like body that can be selectively located on a front face of the press brake 10. In some cases as shown, the display device 12 can be positioned on one of the tables (or beams) 14 of the press brake 10. For example, the device 12 can be positioned on an upper table 14a, and can be located as close to the corresponding clamping beams 16 (of the upper table 14a) as desired. The general size of the display device 12 (as later described) contributes to the device's versatility with regard to positioning. In certain embodiments as shown, the display device 12 can be positioned to abut the clamping beams 16 of the upper table 14a. Such position is favorable not only because the display device 12 can be provided adjacent to the clamping beams 16 and forming tools 18 to be held thereby (shown in FIG. 2), but the device 12 can also form somewhat of a protective cover (or hood) for the beams 16. However, as will be appreciated from the description herein, placement of the display device 12 is not required at such location on the press brake 10. Instead, characteristics of the display device 12 enable it to be selectively positioned (and in some cases, partially or wholly repositioned) as desired. To that end, embodiments described herein include display devices being configured in a variety of differing forms (such as device 12), enabling the devices to be widely versatile with regard to being adapted for and positioned on pressing or punching machines.

As alluded to above, locating the display device 12 on either of the press brake tables 14 (such as the upper table 14a) is made possible via the device's characteristics, including its generally compact size and manageable weight. As a consequence of its size, the display device 12 can be handled with relative ease and can be positioned on the press brake 10 without generally impeding (i.e., adversely affecting or interfering with) its deforming operations. One characteristic of the display device 12 is that it is quite shallow in depth. In certain embodiments as shown in FIG. 2, the device 12 has a depth less than the depths of either of the press tables 14 by at least ⅛. In other and perhaps more preferable embodiments, the device 12 can have a depth less than the depths of either of the press tables 14 by at least ¼. In further and perhaps more preferable embodiments, the device 12 can have a depth less than the depths of either of the press tables 14 by at least ½. In light of its shallow depth, the display device 12 can be located on either of the tables 14 without significantly adding to the table's front profile. By way of comparison, many known positioning systems protrude considerably from the front surface of the press brake's upper table 14a, thereby limiting the range of angles to which certain workpieces can be bent. For example, certain workpieces may need to be bent upwardly in close proximity to the upper table 14a. The display device 12, with its shallow depth, is of limited risk to cause such clearance problems during deforming operations of the press brake 10. However, even in the unlikely scenario that bend clearance becomes an issue, configurations of the display device 12 (as described later) enable partial or wholly repositioning as desired.

FIG. 3A shows an enlarged perspective view of the display device 12 of FIG. 1 in stand-alone (or free-standing) form in accordance with certain embodiments of the invention, while FIG. 3B shows an assembly view of the display device 12. Via these drawings (and the below description concerning size parameters) of the display device 12, the skilled artisan can better appreciate the device's general compactness and shallow depth. In certain embodiments as shown, the display device 12 can be formed of one continuous segment (or single integral body) 20 having desired length. However, the invention should not be limited to such, as the display device 12 can just as well be formed of one or more segments 20. To that end, FIG. 4 shows a plurality of exemplary segments 20 that can be utilized in configuring the display device 12 in accordance with certain embodiments of the invention. For example, as shown, the segments 20 can be formed as desired with regard to extent (e.g., having exemplary lengths, such as "x", "y", "z", or other lengths) and configuration (e.g., having any quantity of displays 24, such as one, two, or three or more displays).

In certain embodiments, as should be appreciated from FIG. 1, the length of the display device 12 can extend across (or span) the entire length of the press brake tables 14. To that end, as described above, the display device 12 can be formed of one or more segments 20, with each segment 20 formed of one or more displays 24. As is known, industrial presses (such as press brakes) are fabricated to come in a variety of different sizes. Thus, by configuring it to be formed of a plurality of segments 20, the display device 12 can be made modular and in turn, highly adaptable to varying lengths of press brake tables. Configuring the display device 12 to be modular in this fashion enables variable yet quick construction of devices 12 of any desired length; i.e., by joining a requisite quantity of segments 20 together in end-to-end fashion. The segments 20 can each be of similar length; however, the invention should not be so limited. In certain embodiments, the segments 20 are configured to be at least 12" in length, and in perhaps more preferable embodiments, the segments 20 are configured to be between approximately 18" and approximately 48" in length, and perhaps in most preferred embodiments, the segments 20 are configured to be between approximately 24" and approximately 36" in length.

As described above, and with reference to FIG. 3A, the display device 12 (or segments 20 thereof) can be configured to include one or more displays 24. However, as further described above with further reference to FIG. 4, quantities and sizes of the displays 24 can be varied as desired. Looking back to FIG. 3B, in certain embodiments, a plurality of displays 24 can be joined in end-to-end manner to form the display device 12 (or a segment 20 thereof) via use of a channel 23. The channel 23, in certain embodiments as shown, is defined with upper and lower inner surfaces 23a, 23b sized to accommodate corresponding upper and lower outer ends 24a, 24b of the displays 24. As such, the displays 24 can be inserted (or slid) one-by-one into the channel 23, with end caps 26 being employed on opposing ends of the channel 23 for retaining the displays 24 inserted therein. More will be later described concerning the collective functioning of these displays 24. However, at this point, it should be appreciated that even with the use of such channel 23, the display device 12 is still afforded a shallow depth and a height not much greater than that of the displays 24. Thus, as described above, the display device 12 can be positioned on press brakes as desired. To that end, the display device 12 can be configured for use on new machines, as well as being configured and correspondingly sized for use on existing machines (i.e., retrofit applications).

The displays 24 can be electrical ink ("e-ink"), LED, LCD, or other like display types. In the case of e-ink type displays, their front surfaces are commonly configured to exhibit high-impact properties. Likewise, LED and LCD type displays can configured with high-impact front surfaces. Therefore, unlike positioning systems used to date with punching or pressing machines, the display device 12 does not dictate using a further protective enclosure therefor; although, the design of the display device 12 does not prevent a protective covering from being mounted over the device's front surface, if desired. However, as a consequence of not dictating a protective enclosure or covering, the displays 24 can be integrally-formed portions of the display device 12.

Being of e-ink, LED, LCD, or other like display types, the displays 24 are capable of being linked (e.g., electrically connected in end-to-end fashion) and synched, availing the connected displays 24 to function collectively. For example, as shown with reference to FIG. 5, the displays 24 are capable of exhibiting proper positions for forming tools 18 to be used on the clamping beams 16, according to deforming operations programmed for the press brake 10. To that end, when linked/synched, the displays 24 are configured for collectively exhibiting extents of the clamping beams 16 on the press tables 14 (corresponding to the positions of the displays 24 on the tables 14), and proper positions for the forming tools 18 to be clamped thereto. The displays 24 are further capable of exhibiting a wide variety of additional information (e.g., parameters relating to the programmed deforming operations), as later described herein.

Continuing with the above, the displays 24 being of e-ink, LED, LCD, or other like display types contribute to the design versatility of the display device 12. For example, as described above, the displays 24 can be fabricated to have a length as long as desired, or as small as 2" in length. To that end, based on length of the display device 12 (or quantities and lengths of its segments 20, as applicable), the displays 24 can be correspondingly sized to span across the display device 12 (or the segments 20 thereof). For example, with reference to the display device 12 shown in FIG. 1 (with enlarged view of such shown in FIG. 3), the device 12 can be formed as one segment 20 with a plurality of linked/synched displays 24. As described above, configuring the display device 12 to be formed of a plurality of joined segments 20 enables the device's length to be varied as desired. To that same end, the displays 24 can be preconfigured to be of varying length(s) to correspondingly span the length of such segments 20 as desired.

Continuing with the above, while the displays 24 can be fabricated to have lengths as desired, using displays 24 of a more typical and readily-available (i.e., standard) length can be more cost effective. For example, in certain embodiments, a significant extent of the display device 12 (or the segments 20 thereof) can be configured with displays 24 of such standard length. In such embodiments, the displays 24 of the display device 12 are configured to be at least 6" in length, and perhaps in more preferable embodiments, the displays 24 are configured to be between approximately 9" and approximately 36" in length, and perhaps in most preferred embodiments, the displays 24 are configured to be between approximately 12" and approximately 20" in length. However, in some cases, areas of the display device 12 may dictate using one or more displays 24 of non-standard (or atypical) length (such as at one or more ends of the device 12) to correspondingly enable the device 12 to extend across the tables 14. In these cases, the e-ink, LED, LCD, or other like display types permit such atypical sizing.

Figure 5:
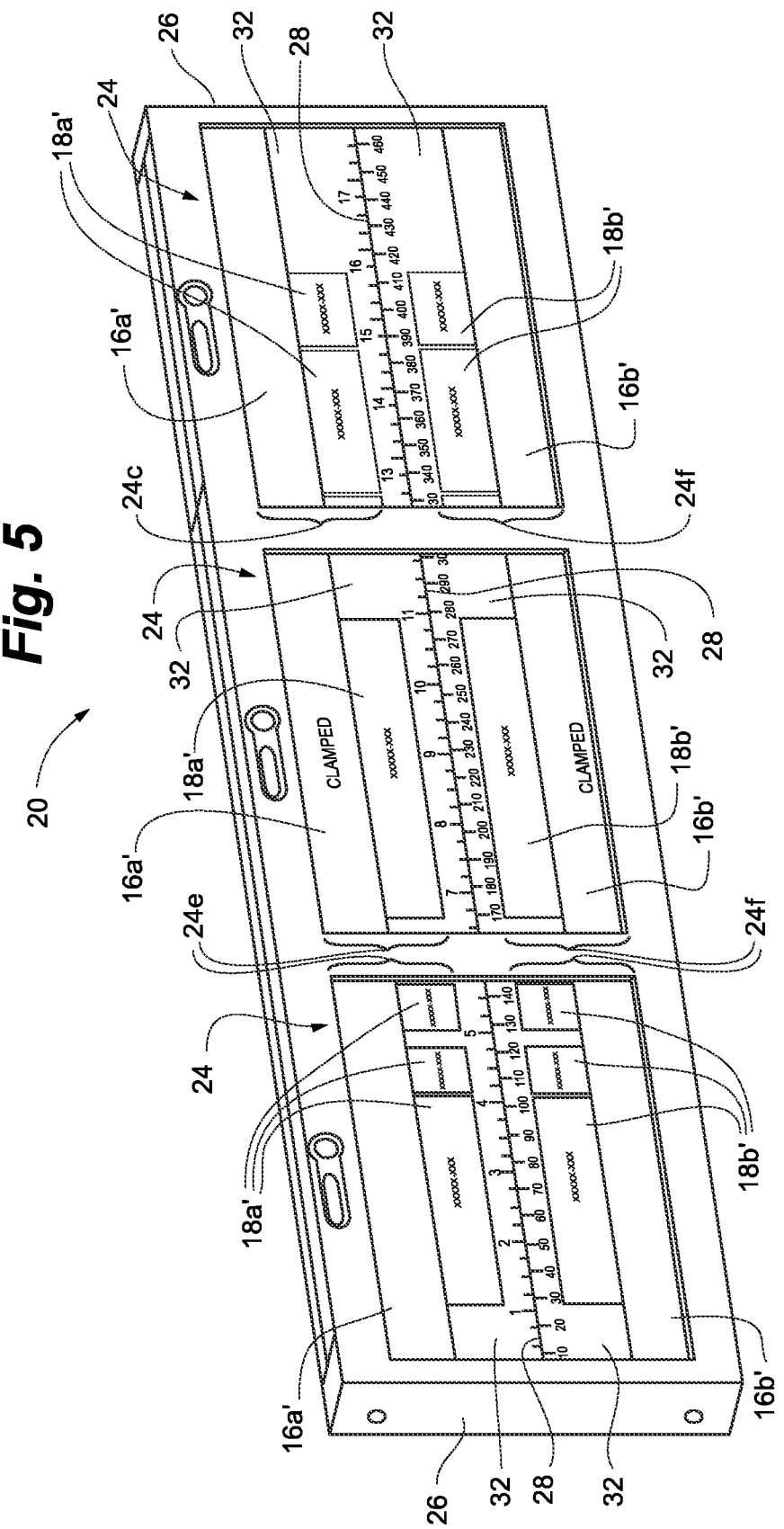
FIG. 5 is a perspective view of the display device of FIG. 1 with detailed information provided on displays thereof in accordance with certain embodiments of the invention.

With further reference to FIG. 5, the drawing illustrates a segment 20 of the display device 12 (which can define the device 12 wholly, or in part as one of a plurality of segments 20 thereof). Similar to FIG. 3A, the segment 20 of the display device 12 is shown in stand-alone (or free-standing) form, but with detail being provided on the displays 24 in accordance with certain embodiments of the invention. As described above, when linked/synched, the displays 24 are configured to function collectively in exhibiting corresponding extents of the clamping beams 16 and proper positions for the forming tools 18 to be used thereon. With continued reference to the segment 20 shown in FIG. 5, it should be appreciated that the electronics and wiring for such linking/synching between the displays 24 are generally concealed (and protected) within the displays 24 themselves. In certain embodiments, a power source (not visibly shown), such as one or more rechargeable batteries, can be further provided within the displays 24 to provide power as needed (e.g., for emergency power). Other features of the displays 24, e.g., with reference to the display 24 shown in FIG. 3A, can involve one or more of power switch 17, screen controls 19, and speakers 21 for audio input/output.

As described above, in certain embodiments, segments 20 of the display device 12 can be configured with end caps 26. As should be appreciated, in joining segments end-to-end, the end caps 26 can provide a platform for operably joining segments 20 in end-to-end fashion. With reference back to FIG. 3B, in certain embodiments, the end caps 26 can also be configured to function as an intermediary in linking/synching of displays 24 held within a given segment 20 and/or linking/synching of displays 24 of two or more segments 20. To that end, in certain embodiments as shown in FIG. 4, the end caps 26 can be configured with a connector 25 for power and data transmission (e.g., USB, Ethernet, etc.) to/from the displays 24 of the segment 20. Further, in certain embodiments, and with reference to FIGS. 4 and 5, opposing ends 24c, 24d of the displays 24 are configured with a like connector 25 for power and data transmission (e.g., USB, Ethernet, etc.) for linking/synching purposes, e.g., either with the connector 25 of the end caps 26 (for communication with other displays 24 of adjoined segments 20 of the display device 12) or other displays 24 of the same segment 20. As shown, in certain embodiments, one or more further connectors can be provided on one or more of the ends 24c, 24d of the displays 24. For example, as shown, one such connector 27a can be provided on display end 24c for bringing power to the display 24, e.g., for charging emergency power source thereof as applicable.

Figure 6:
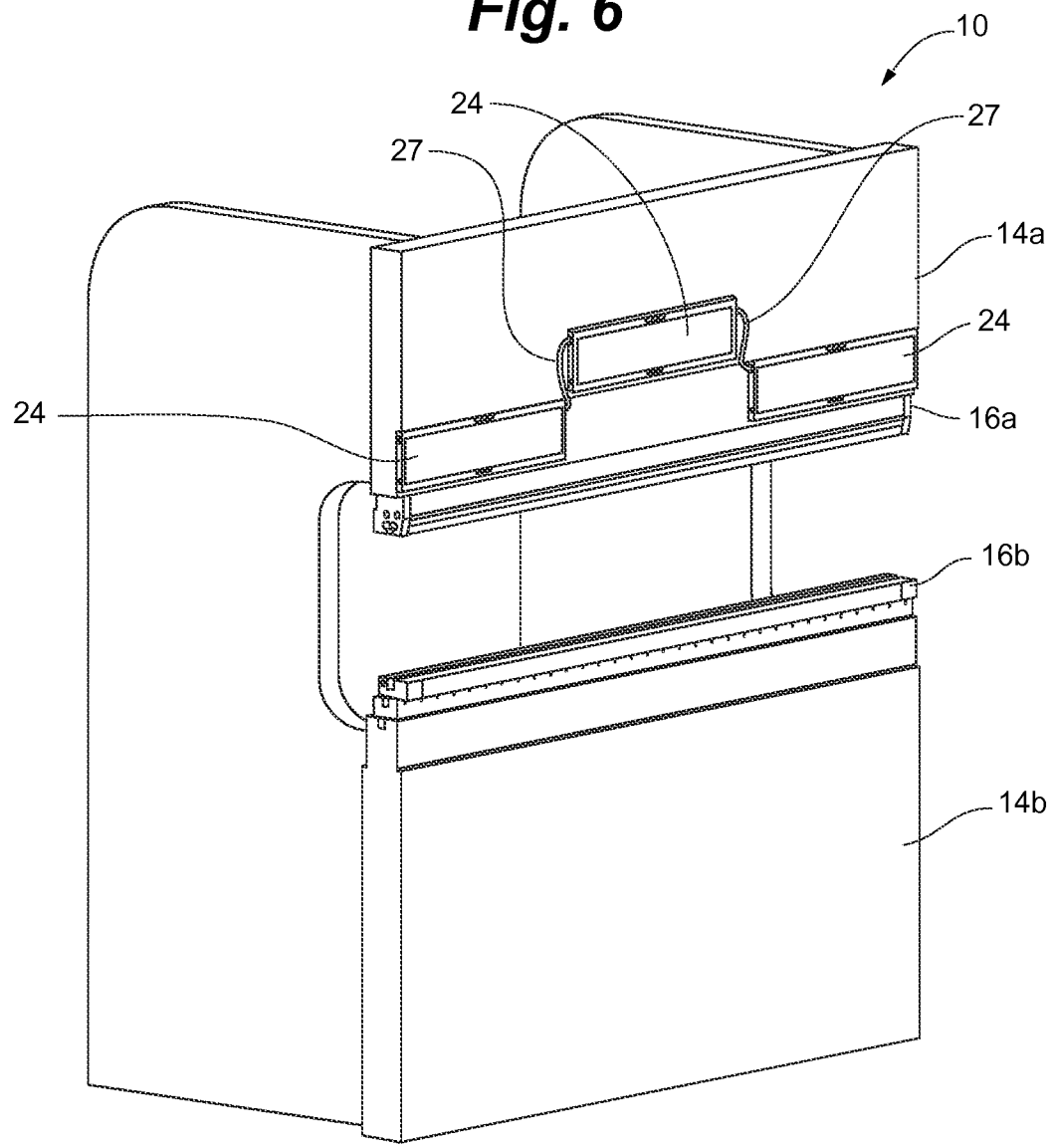
FIG. 6 is a perspective view of the press brake of FIG. 1, showing a display of the display device of FIG. 1 separated from the device in accordance with certain embodiments of the invention.

More description of the linking/synching will be described below with respect to FIGS. 7-9. However, based on the displays 24 being configured with such linking/synching connectors 25, it should be appreciated that one or more of the displays 24 can be removed and repositioned from the display device 12 if its original location (relative to the rest of the display device 12) impedes a particular deforming operation of the press brake 10. An example of such repositioning is illustrated in FIG. 6, whereby one of the displays 24 is shown as having been repositioned apart from the other displays 24 of the display device 12. As shown, the repositioned display 24 is moved to a higher height on the upper table 14a than the other displays 24, yet can still be linked/synched with the other displays 24 via the use of electrical jumper wires 27 extending between the connectors 25 of the displays 24, in accordance with certain embodiments of the invention.

FIGS. 7A-7C show different views of an exemplary display 24' forming a display device 12' for a press brake (such as press brake 10 of FIG. 1) in accordance with certain embodiments of the invention. While similar to the displays 24 already described, the display 24' of FIG. 7A-7C is configured to function with the press brake 10 in a singular capacity, conveying information pertaining to each of the deforming operations programmed for the press brake 10. As such, the display 24' is sized to extend across a corresponding extent of the press tables 14 of the press brake 10. FIGS. 7A-7C respectively illustrate front, side, and enlarged partial side elevation views of the display 24'. Given the singular use of such display 24' as the display device 12' for the press brake 10, linking/synching connectors 25 (such as described above with reference to the displays 24 of FIG. 3B) are not required (and thus, not defined) for the display 24'. Nevertheless, it should be appreciated that such connectors 25 can be provided with the display 24' if desired.

Alternately, in certain embodiments and perhaps most clearly shown in FIG. 7C, the display 24' can be configured with an electrical strip 29 on its upper end 24a' for power and data communication thereto. In certain embodiments, the electrical strip 29 extends across the length of the upper end 24a' to contact with corresponding inputs as needed for powering and data transmission purposes. To that end, and as further shown in FIG. 7C, the electrical strip 29 can include a plurality of contacts, e.g., two contacts 31 for power and one contact 33 for data transmission. FIG. 8 shows a side elevation view of an upper press table 14a of press brake 10 in accordance with certain embodiments of the invention. As illustrated, and with reference to FIG. 1, the upper press table 14a can be defined with a shelf 15 including a corresponding electrical strip 29' and connectors 31', 33' configured to align with and contact the electrical strip 29 of the display 24' and its connectors 31, 33. It should be appreciated that upon powering the display device 12' in this fashion, the electrical strip 29 can be additionally tapped in powering any further electrically-driven accessories that may be used (or run and controlled from the display device 12') at or near the press tables 14. Alternately, even though the display 24' may not be configured with connectors 25 (for power/data transmission, see FIG. 3B), such connectors 25 can be provided with the display 24' as desired. To that end, in certain embodiments, the display device 12' can correspondingly serve as a bridge to bring power to any of the same electrically-driven accessories that may be used (or run and controlled from the display device 12') at or near the press tables 14.

FIGS. 9A-9C show further detail with regard to features of the displays 24 of FIG. 4 for linking/synching functionality with regard to other displays 24 of the display device 12. FIG. 9A illustrates a perspective view of a display 24 in accordance with certain embodiments of the invention, while FIGS. 9B and 9C show perspective views of exemplary configurations of opposing ends 24c and 24d of the display 24. As shown (and as previously described above), each of the display ends 24c, 24d is configured with a connector 25 for power and data transmission (e.g., USB, Ethernet, etc.). To that end, these connectors 25 are female receptacles, wherein one of the connectors 25 of each display 24 further includes a two-way male plug 25a for bridging the connectors 25 of two of the displays 24 for linking/synching purposes. As described above with reference to FIG. 3B, in certain embodiments, one or more further connectors can be provided on the display ends 24c, 24d. For example, as previously described above, one such further connector 27a can be provided on display end 24c for bringing power to the display 24. Alternatively or in combination, another further connector 27b can be provided to accept a data card 35 therein.

Turning back to the functionality of the display device 12, as a consequence of its displays 24 being of e-ink, LED, LCD, or other like display types, information conveyed by the displays 24 can be virtually without limit, both in terms of quantitative and/or qualitative information. To that end, each display 24 is capable of providing detail and characteristics which would be difficult if not impossible to provide with the types of positioning systems constructed to date with punching or pressing machinery. As described above and as shown in FIG. 5, the displays 24, in certain embodiments, convey information involving the forming tools 18 and the clamping beams 16 of the press brake tables 14. For example, the displays 24 can be configured to show representations 18a' and 18b' corresponding to the to-be-used punches 18a and dies 18b, respectively, and their proper positions with respect to corresponding extents of the clamping beams 16. Further detail concerning this will be described below; however, at this point, it should be appreciated that such representations are but one way by which characteristics of the requisite forming tools 18 can be conveyed, and in turn clearly identified by the operator. Likewise, and with reference back to FIG. 1, the displays 24 can also be configured to exhibit representations 16a' and 16b' for the upper clamping beam 16a and lower clamping beam 16b, respectively.

Each display 24, in certain embodiments, can be thought of as including a plurality of partitions, with each partition configured to convey one or more forms of information to the operator. For example, as shown in FIG. 5, each display 24 includes an upper partition 24e configured to exhibit a corresponding representative section of the upper clamping beam 16a (via representation 16a') and the punches 18a (via representation 18a') to be clamped thereon for a programmed deforming operation. Likewise, each display 24 includes a lower partition 24f configured to exhibit a corresponding representative section of the lower clamping beam 16b (via representation 16b') and the dies 18b (via representation 18b') to be clamped thereon. In certain embodiments as further shown, located between the upper and lower partitions 24a, 24b of each display 24 is an axis 28 showing corresponding length dimension of the section of the clamping beams 14 correspondingly associated with the display 24. Given the above, it should be appreciated that the displays 24 are configured to depict the forming tools 18 as they should be properly positioned on the press brake clamping beams 16. However, the displays 24 also offer degrees of detail that not only enhance the tooling/tables relationship, but also provide a format of providing additional information to be conveyed by the display device 12 and additional functionality therefor, as described below.

In certain embodiments, such additional information can relate to characteristics pertaining to one or more of the press brake 10, the display device 12, the press brake tables 14 (or the clamping beams 16 thereof), and the forming tools 18 to be used. For example, such information relating to the tools 18 can include corresponding part numbers 30 (as shown in FIG. 5), part dimensions, part manufacturer, etc. In certain embodiments, as shown in FIG. 5, the additional information pertaining to the tools 18 can be correspondingly superimposed on the tool representations 18a', 18b'. Likewise, information pertaining to the status of the clamping beams 16 can be correspondingly superimposed on the clamping beam representations 16a', 16b', examples of which will be described later. As further shown in FIG. 6, the displays 24 have portions external to (or outside) the forming tool and clamping beam representations, i.e., empty space areas 32. In certain embodiments, these empty space areas 32 involve portions of the displays 24 configured to be interfaced by the operator so as to retrieve details regarding the operations programmed for the press brake 10 and control characteristics for the display device 12. More of this will be described below. However, at this point, it should be understood that such details can be retrieved (in multiple languages) for informational and/or modifying purposes, and that these details involve any of a plurality of aspects, such as pressing angle, back gage settings, crowning parameters, assessing part drawings to verify dimensions, linking to web sites for additional information, contacting the machine or tooling manufacturer for customer service, bending sequence and/or change of tools 18 needed therefor, and parameters of the console 36 (shown in FIG. 12) used with the press brake 10.

Figure 10A:
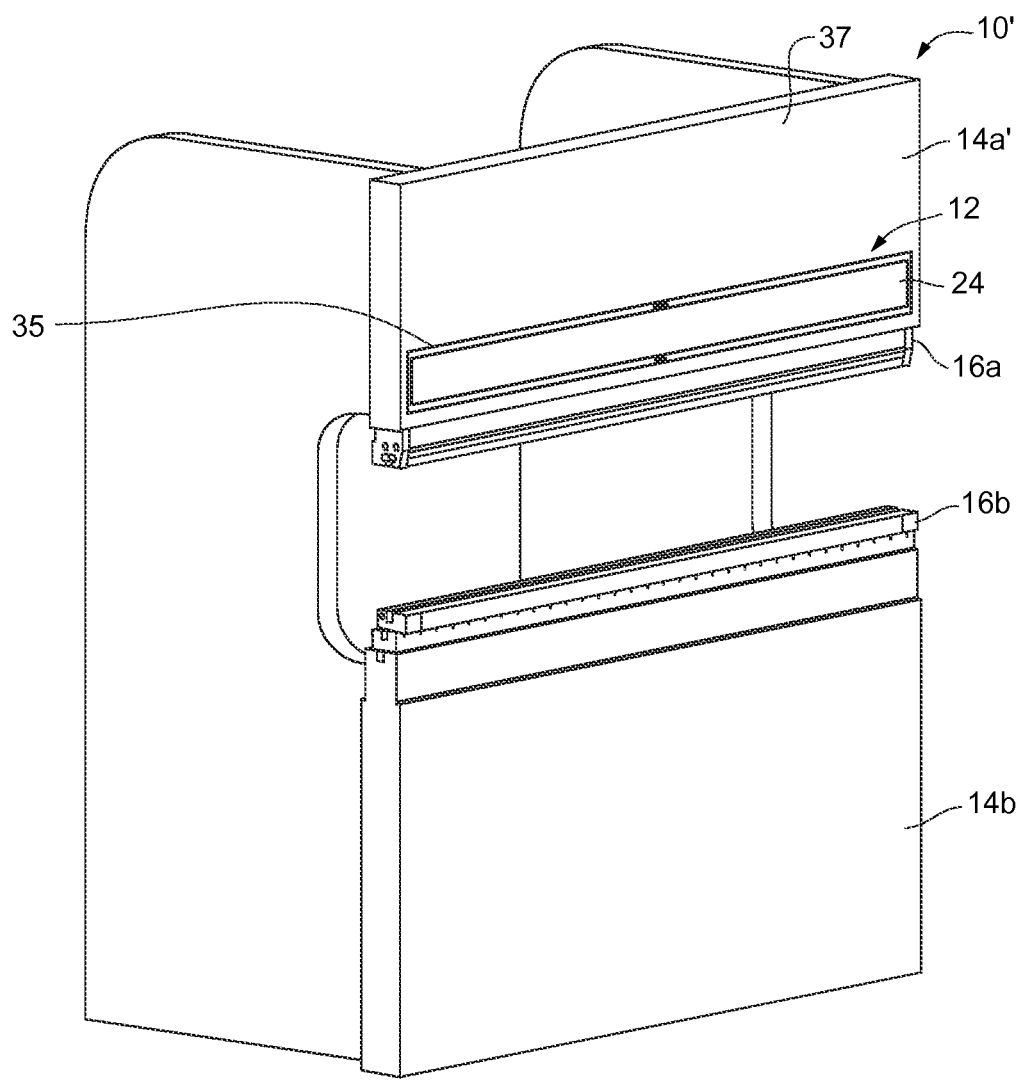
FIGS. 10A-10C show perspective views of a press brake, upper press table thereof, and display device in accordance with certain embodiments of the invention.
Figure 10B:
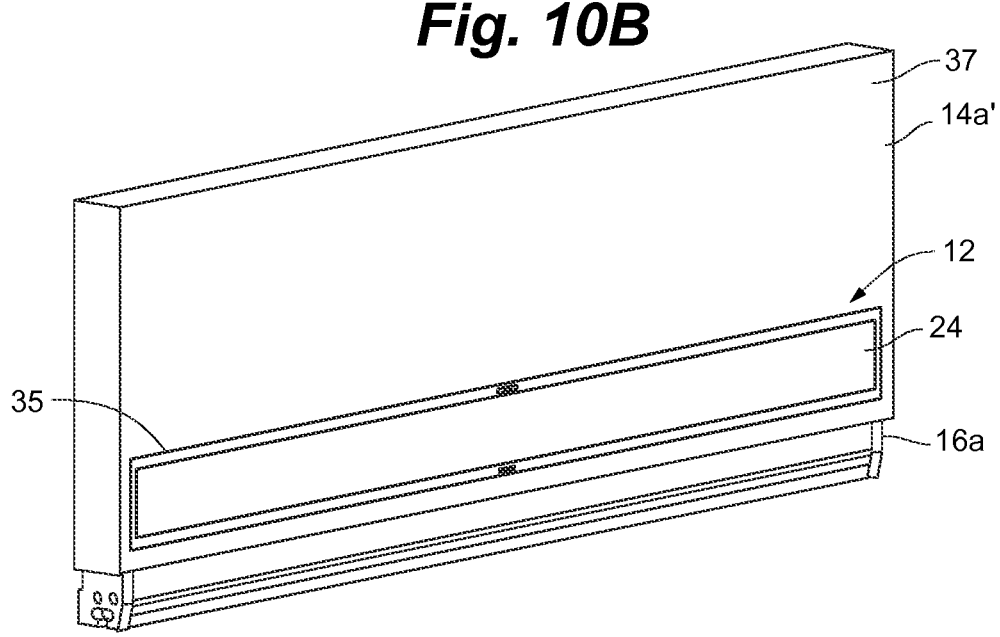
Figure 10C:
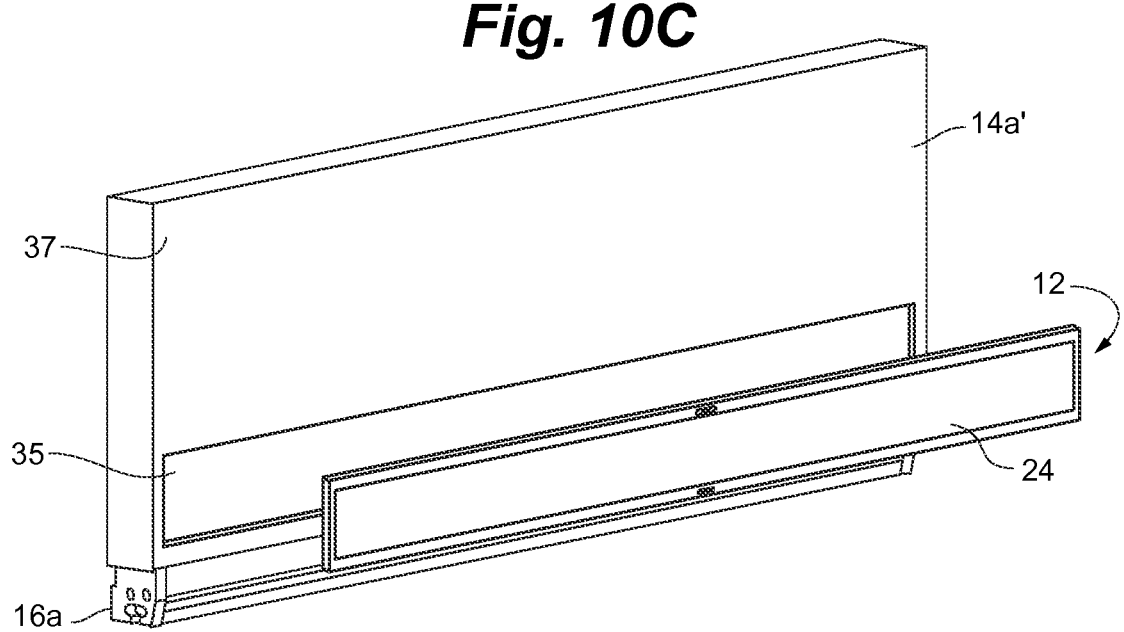

To this point, the display device 12 has been described as a bar-like body that is selectively located on a press brake 10, and with further reference back to FIG. 1, in certain embodiments, the device 12 can be positioned on an upper table 14*a* of the press brake 10, and located as close to the upper clamping beam 16*a* as desired. To that end, embodiments have been described (with reference to FIG. 2) in which the display device 12 is configured to sit atop the upper table 14*a*, thereby adding to the front profile of the table 14*a*, even if slightly due to the shallow depth of the display device 12. To that end, while it is reduced, there is the possibility that the display device 12 may still impede with certain deforming operations of the press brake 10. One way of addressing this issue is configuring the display device 12 to be separated and repositioned in part, as exemplified with reference to FIG. 6. However, another way of addressing this issue is to prevent the front profile of the press brake 10 from being increased with the use of the display device 12. FIGS. 10A-10C illustrate corresponding configurations for the display device and the press brake for achieving this, as described below.

FIG. 10A shows a perspective view of a representative press brake 10' with a display device 12 mounted thereon, in accordance with certain embodiments of the invention, while FIG. 10B and FIG. 10C show an upper table 14*a'* of the press brake 10' with the display device 12 mounted thereon, and show the upper table 14*a'* and device 12 separated, respectively. With reference to FIG. 10C, the upper table 14*a'* is provided with a depression 35 sized to accommodate the display device 12 in recessed orientation in relation to the front surface 37 of the upper table 14*a'*. In certain embodiments as shown with reference to FIG. 10B, the depression 35 can be defined to accommodate the display device 12 on each of its sides in a flush manner; however, the invention should not be limited to such. Instead, in other perhaps more preferable embodiments, the depression 35 can be defined to be significantly larger than a size of the display device 12 in order to accommodate larger-sizes of the display devices 12, if needed. Further, while the display device 12 is shown as a single display 24 (e.g., as previously exemplified in FIG. 5), the invention should not be limited to such. For example, the display device 12 can just as well involve the configuration of FIG. 1 (e.g., having channel 23 and plurality of displays 24); however, it should be appreciated that the depression 35 would in turn need to be extended in size (e.g., expanded and deepened) so as to accommodate in flush manner the display device 12 when used with the channel 23 and end caps 26.

Continuing with the above, the display devices 12, 12' described to this point are adaptable for conveying a wealth both of quantitative and qualitative information concerning programmed deforming operations. As a consequence, the displays 24 of such devices 12, 12' dictate a suitable screen size to exhibit such information. However, if this information was to be refined to only a subset of such information, such as only involving forming tool mounting position information, the screen size could be significantly decreased in size, e.g., in height. Consequently, the press brake area accommodated by such display device 12" (as exemplified in FIGS. 11A and 11B) would be correspondingly reduced.

In particular, in certain embodiments, the height of the display device 12", in using one or more displays 24" of e-ink, LED, LCD, or other like display types, could be decreased in size such that its exhibited position information can be provided atop the press brake tables 14, yet closer in proximity to corresponding clamping beams 16 (as opposed to display devices 12, 12'). In certain embodiments, the height of the display device 12" is less than ½ the height of the display device 12 of FIG. 1 and the display device 12' of FIG. 8. To that end, FIG. 11A shows a perspective view of the representative press brake 10 of FIG. 1 with display device 12" mounted on the upper press table 14*a*, in accordance with certain embodiments of the invention. Furthermore, in limiting the scope of information to forming tool mounting position information, the height of the display device 12" can be decreased to such extent that the device 12" can be located on either of the clamping beams 16. To that end, FIG. 11B illustrates a perspective view of the representative press brake 10 of FIG. 1 with display device 12" mounted on the upper clamping beam 16*a*, in accordance with certain embodiments of the invention. Alternatively, and with reference to FIGS. 10A-10C, in certain embodiments, the display device 12" can be similarly recessed in a depression of one or more of the clamping beams 16.

With reference back to FIG. 1, in certain embodiments, a display tablet 22 is provided on the front surface of the press brake upper table 14*a*. The display tablet 22 is a computing unit, and in certain embodiments, can involve any one of the well-known commercially-available computing tablets. Examples of such tablets include Apple IPad, Samsung Galaxy, Acer Iconia, Amazon Kindle, Google Nexus, etc. As should be appreciated, the display tablet 22 has certain characteristics similar to those of the display device 12. For example, the display tablet 22 is quite compact in size, e.g., possibly having depth to be even less than that of the display device 12. With reference to FIG. 2, in certain embodiments, the tablet 22 has a depth less than ½ the depth of the display device 12. Further, with reference to FIG. 1, the tablet 22 includes a screen which, in certain embodiments, is of greater size than that of any of the displays 24 of the display device 12.

Figure 19:
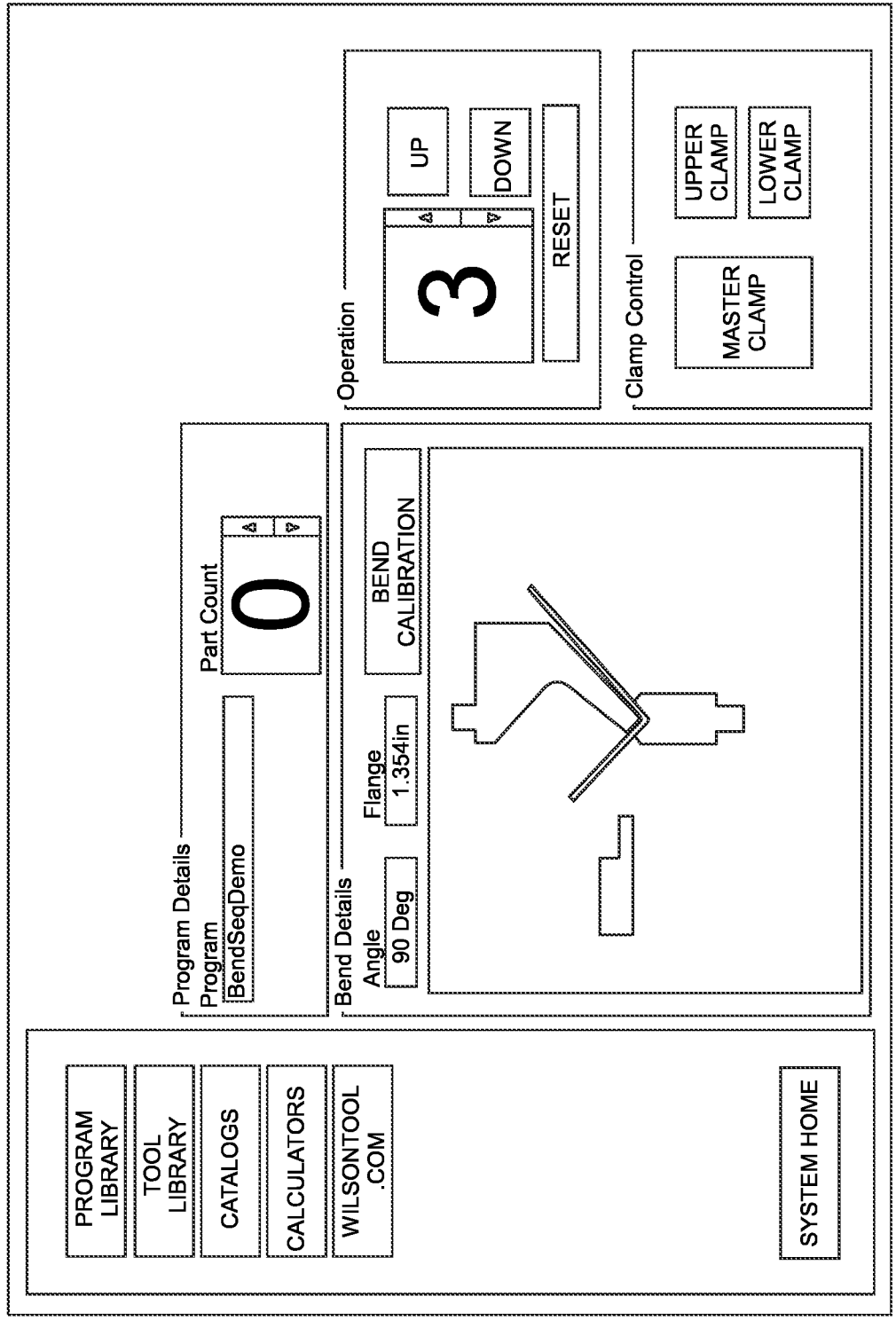
FIG. 19 is an exemplary screen shot of a display tablet used in conjunction with the display device of FIG. 1 in accordance with certain embodiments of the invention.

Given the above-noted characteristics, the display tablet 22 can be used and positioned on the press brake 10 as desired. For example, as shown in FIG. 1, the display tablet 22 may be centrally positioned on the upper beam 14*a* of the press brake, atop the display device 12. To that end, the display tablet 22 can be used in conjunction with the display device 12. For example, in certain embodiments, the display tablet 22 can be used to selectively show parameters of any of the displays 24 of the display device 12. Such parameters can include any of the aforementioned details regarding operations programmed for the press brake 10 and control characteristics for the display device 12. As a consequence, the displays 24 of the display device 12 can be regulated to showing characteristics pertaining to the clamping beams 16 and the forming tools 18 to be clamped thereon. However, the invention should not be limited to such. For example, the display tablet 22 can be used to show parameters of any of the press brake 10, the display device 12, the press tables 14 (and clamping beams thereof 16), and the forming tools 18. In one such application, as exemplified in FIG. 19, the tablet 22 can be used to show tool parameters (e.g., profiles) which could be shown in larger (and thus, more enhanced) detail as opposed to the displays 24 of the display device 12. One particularly advantageous feature of the display tablet 22 is its portability, such that the operator can work at any location around the press brake 10 while carrying and working from the tablet 22. More will be described of this later.

Figure 12:
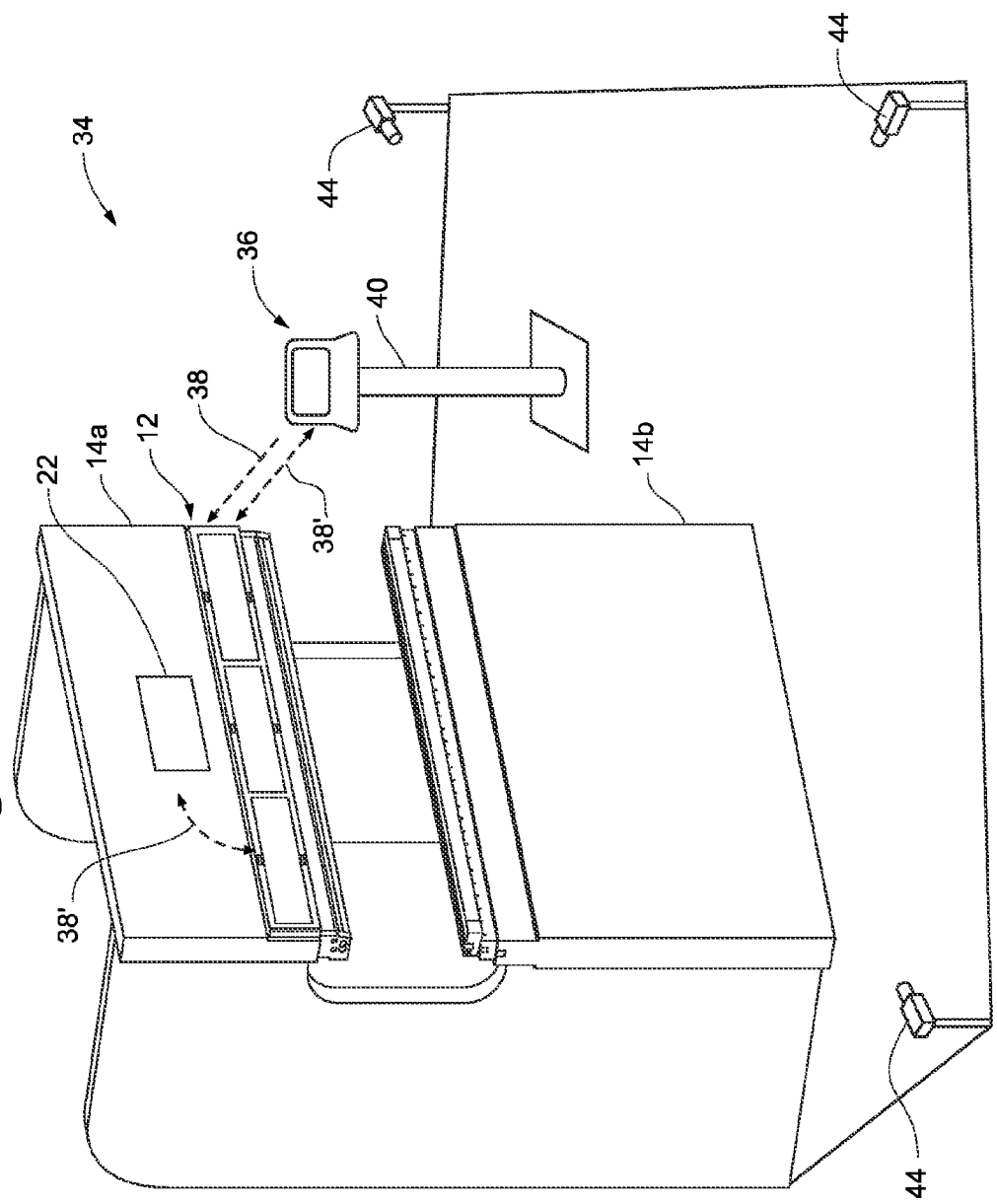
FIG. 12 is a perspective view of an exemplary press brake work area in accordance with certain embodiments of the invention.

To this point, the information described as being exhibited (and conveyed to the operator) by the embodied display device 12 can be considered as static, meaning that the information is provided to the device 12 to be subsequently shown thereon (in some cases, as needed). As the skilled artisan would appreciate, a console (e.g., a PC or other like computer system) is typically used by a press brake operator for controlling the press brake 10 and selecting bending operations therefor. In general, the console is hard wired to, yet positioned remote from the deforming area of, the press brake 10. FIG. 12 shows such an exemplary press brake work area 34 in accordance with certain embodiments of the invention, showing the representative press brake 10 of FIG. 1 and exemplary console 36. The display device 12, in certain embodiments, can be configured to function as a "supplemental" device, which, as described above, provides static information to the operator relating to the press brake operations selected via the console 36. In such case, the console 36 is configured to pass along information both to the display device 12 and to the press brake 10. As should be appreciated, the display tablet 22 can be configured to receive information from one or more of the display device 12 and the console 36.

Communication from the console 36 to the display device 12 can be the result of the console 36 being hard wired to the bar 12. However, in certain embodiments, the display device 12 is configured for receiving communications from the console 36 in a wireless manner 38. As described above, the display tablet 22 is similarly configured for such wireless communication 38 with the display device 12. Wireless designs are well known in the art. For example, the display device 12 can be equipped with one or more conventional receivers or transceivers and corresponding electronics to function with Wi-Fi, Bluetooth, or other wireless protocols. As should be understood, and with reference to FIG. 5, electrical signals wirelessly received by the display device 12 would be processed (e.g., internal to the device 12) and the information communicated therein would be respectively routed to the displays 24 of the device 12 as a result of the displays 24 being synched, as described above. Further underlying conditions in configuring the display device 12 to be able to communicate with the console 36 involve the control system of the device 12 being properly configured to link with the control system of the console 36. This linking generally involves the operating systems and processing protocols of the device 12 and console 36 to be aligned. In new machine design applications, this linking can involve an easier process due to configuration parameters of the control systems being known from the start. However, for existing machine design applications, the console's control system needs to be determined in advance so the display device control system can be designed and programmed accordingly.

As alluded to above, the display device 12 can be configured to provide a plurality of information regarding operations programmed for the press brake 10 and control characteristics for the device 12. However, as should be appreciated (particularly in view of the exemplary segment 20 shown in FIG. 5), the information exhibited on the displays 24 (e.g., the clamping beam representations 16*a*', 16*b*' and tool representation 18*a*', 18*b*') already utilizes a majority of the screen space. Thus, in certain embodiments, the display device 12 can also be configured to function as an "interfacing" device. As described above, information regarding operations programmed for the press brake 10 and control characteristics for the display device 12 can be accessed (and further or alternatively exhibited by the displays 24) as desired. In certain embodiments, such information is retrieved via the user interfacing with the displays 24. To that end, such information can be shifted as desired by the operator from the displays 24 to the display tablet 22.

Figure 18A:
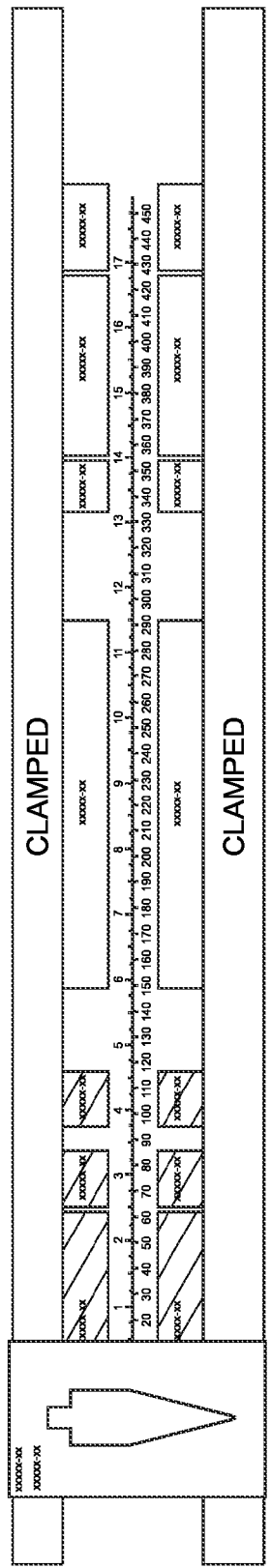
FIGS. 18A and 18B are exemplary screen shots of a display showing pop-up windows exhibited therewith in accordance with certain embodiments of the invention.
Figure 18B:
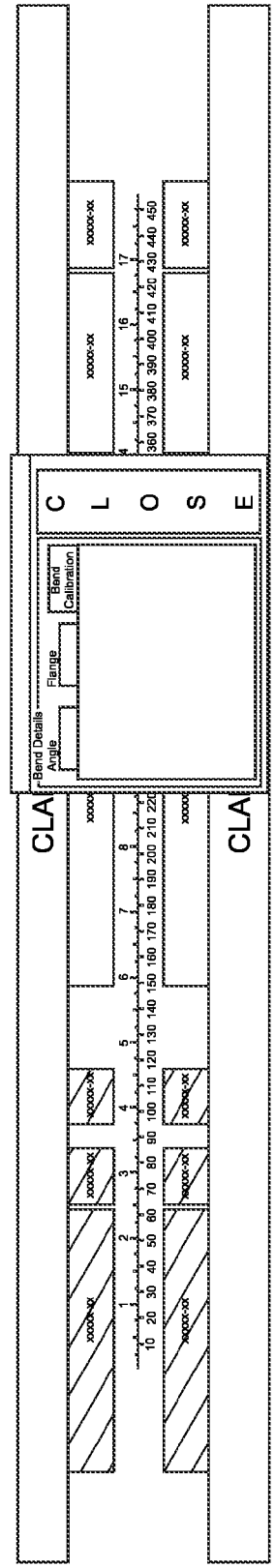

E-ink, LED, LCD, or other like display types can be configured for touch screen functionality. As should be appreciated, such functionality is generally processor driven. To that end, in certain embodiments, each display 24 can be configured to generate varied resistive or capacitive response for a particular set of distinct finger contacts (e.g., distinguished by quantity of fingers and/or grouping of fingers) applying instantaneous pressure (e.g., via a tap of the fingers) on the display screen. Each particular resistive or capacitive response (when run through an internal processor) results in distinct information regarding the programmed press brake operations or control characteristics for the display device 10 being retrieved (from internal memory storage) and exhibited on the display 24. For example, as illustrated in FIG. 18B, a tap or swipe on a particular display 24 can result in a pop-up screen being exhibited, showing machine control parameters. Alternatively, as illustrated in FIG. 18A, a tap or swipe on a tool representation 18*a*' or 18*b*' on a particular display 24 can result in a pop-up screen being exhibited, showing further detailed information concerning the corresponding tool 18. As described above, in certain embodiments, such finger contacts can be made at the empty areas 32 of the display 24. The information correspondingly retrieved is exhibited on at least a part of the display 24, and in certain embodiments, is exhibited in a manner that permits the clamping beam representations 16*a*', 16*b*' and tool representations 18*a*', 18*b*' to still be shown, at least in part. In certain cases, as a result of further distinct finger contacts (such as one or more taps or swipes with one or more fingers) made on the display screen, the retrieved information can be expanded/shrunk in size, moved to different locations on the screen, or can be removed in its entirety (either closed down or shifted to be shown on the display tablet 22) so the display 24 can revert back to exhibiting the clamping beam representations 16*a*', 16*b*' and tool representations 18*a*', 18*b*' only.

With reference back to FIG. 12, while the console 36 is shown as being positioned on a stand 40 beside the press brake 10, it could just as well be supported by an extension protruding from the press brake 10. Regardless, the console 36 is generally positioned away from (e.g., off to the side of) the press brake 10 due to the general size of the console 36 and lack of area on the press brake 10 for accommodating such console 36. As a consequence of such location of the console 36 with regard to the press brake 10, the operator is able to monitor the working area 34 for the press brake 10, making sure the area is clear prior to and during deforming operations. However, keeping the console 36 away from the press brake 10 also dictates the operator making a plurality of trips between console 36 and press tables 14 or clamping beams 16 in checking or confirming parameters for the press brake operations.

To reduce time spent at the console 36 (such that the deforming operations can be performed in a timelier manner), the display device 12 and/or the display tablet 22 can be configured to provide information that the console 36 has conventionally been relied on to convey. Some examples already described include static information that relates to one or more characteristics concerning the press brake 10, the display device 12, the clamping beams 16, and the forming tools 18 to be used. This information may additionally include check-lists, prompts to verify certain parameters, instructions/guidance for next process steps, etc. To that end, the more information that the display device 12 and/or the display tablet 24 are configured to provide, the more efficient the time spent at the press brake 10 can be. For example, in certain embodiments, once parameters of the deforming operations are set via the console 36, the display tablet 22 can subsequently be used to convey the information which the console 36 has thereafter been generally relied on to convey. Thus, in certain embodiments, the operator can use the console 36 initially for setting the press brake operations, and then spend the majority of time afterward at the press tables 14 for performing the operations. To that end, it should be understood that there are applications in which the display tablet 22 may take the place of the console 36.

In certain embodiments, the display device 12 is configured to have functionality beyond that of a "supplemental" and/or "interfacing" device, as described above. For example, in certain embodiments, the display device 12 can be further configured to function as an "interactive" device with regard to what is shown on its displays 24. To that end, the information exhibited (and conveyed to the operator) by the embodied display device 12 can be static (as exemplified above); however, in the event of certain external cues, the information exhibited can be changed as necessary. In certain embodiments, the external cues can stem from the operator. For example, the external cues can involve any of a plurality of operator actions. As described above, one such action can involve the operator touching a screen of one of the displays 24 via one or more finger contacts, only in such cases, further finger contacts (taps and/or swipes) with the screens of the displays 24 can trigger corresponding changes to certain of the information exhibited on the display.

Figure 16A:
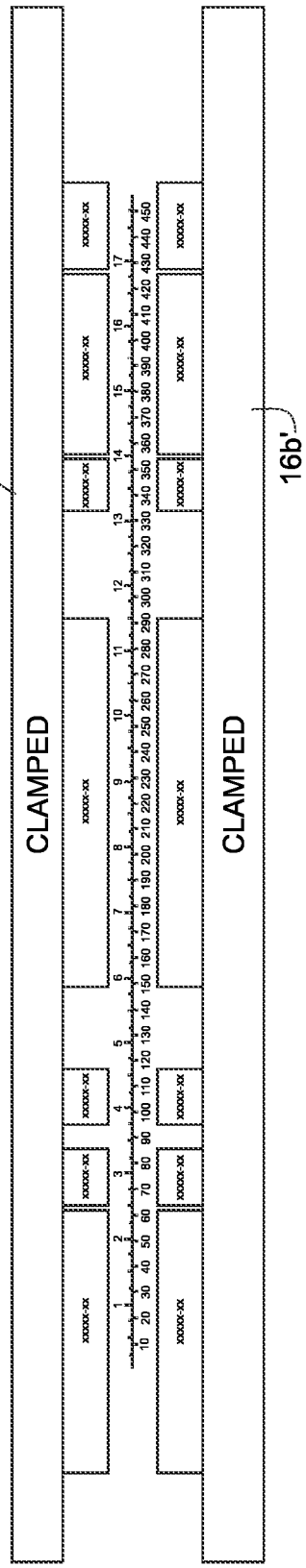
FIGS. 16A and 16B are exemplary screen shots of a display of the display device of FIG. 1, having varied appearance based on changes in status of clamping beams, in accordance with certain embodiments of the invention.
Figure 16B:
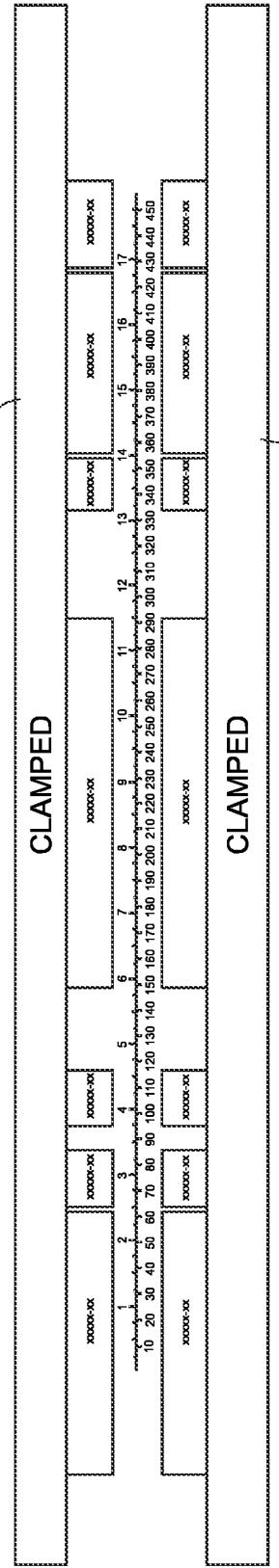

In certain embodiments, the appearance of change made on the displays 24 can be represented in terms of text (e.g., being added, removed, or modified) and/or color (e.g., being changed from one color to another or simply being changed to a lighter or darker shade). This would not only allow the change to be highly visible, but would serve as a clear differentiator from other of the displays 24 that were not changed. For example, looking to the exemplary display screen shots of FIGS. 16A and 16B, the status of the clamping beams 16*a*, 16*b* is always shown via corresponding text. However, because clamp status is crucial to performing safe deforming operations with the press brake 10, the differing statuses of the clamping beams 16*a*, 16*b* (i.e., clamped or unclamped), in certain embodiments, can also be represented via color. An activated (or clamped) status is the safer condition of the two clamp statuses. As such, for an activated (or clamped) status (as provided in FIG. 16A), the representative clamping beams 16*a*', 16*b*' can have a cooler color (such as the color blue) along with the written text "CLAMPED" superimposed on the representations 16*a*', 16*b*'. Conversely, for a non-activated (or unclamped) status (as provided in FIG. 16B), the representative clamping beams 16*a*', 16*b*' can have a very warm (and highly noticeable) color (such as the color red) along with the written text "UNCLAMPED" superimposed on the representations 16*a*', 16*b*'.

In certain embodiments, such status pertaining to the clamping beams 16 of the tables 14 can be changed via an operator tapping the clamping beam representations 16*a*', 16*b*' on the display 24. As would be appreciated, upon changing such clamp status on one of the displays 24, the clamps 16 of the corresponding extent of the tables 14 would be so actuated. More of this will be described below. However, at this point, it should be appreciated that other finger contact variations (such as swiping with fingers) could be used just as well. Further, the invention should not be limited to operator external cues involving physical contact with the screens of the display 24. For example, auditory cues from the operator (captured by speakers 21 positioned on the display device 12) could just as well provide the trigger for such changes, provided the display device 12 and its displays 24 are configured with corresponding electronics to process (and thereby interpret) the auditory cues and programmed for triggering the desired change to the static information. Another example can involve physical cues (i.e., physical movements, such as gestures of one or more of the operator's hands as positioned on the operator's body) from the operator (captured by cameras 44 positioned remote from the display device 12 but configured for wireless communication with the device 12).

As alluded to above, provided a change is made at the display device 12 with regard to characteristics relating to one or more of the press brake 10, the display device 12, the tables 14 (or clamps 16 thereon), and the forming tools 18, the actual change to the corresponding apparatus (or portion thereof) may be dictated. In continuing with the example provided above, if the status of certain of the clamps 16 over an extent of the tables 14 is changed from UNCLAMPED to CLAMPED, the display device 12 must communicate the same to either the console 36, the press brake 10, or a separate clamp control for this to take place. For example, in cases in which the change is only needed to temporarily stop the deforming operations (whereafter the operations are resumed), such communication may only be directed to the press brake 10. However, if the change dictates modification being made to the present or subsequently-programmed deforming operations, such communication may be directed to one or more of the press brake 10 and the console 36.

It should be appreciated that such communications can be made possible by having the display device 12 hardwired to the both the press brake 10 and the console 36. However, in certain embodiments, the display device 12 is configured for receiving communications from and transmitting communications to the console 36 and/or the press brake 10 in a wireless manner 38'. Wireless designs are well known in the art, and were already briefly described above with relation to one-way communication to the display device 12. These same teachings would similarly apply here. However, in the case of two-way wireless communication, the display device 12 can be equipped with one or more conventional transceivers and corresponding electronics to function with Wi-Fi, Bluetooth, or other wireless protocols. As should be understood, and with reference to FIG. 5, changes made with regard to any one of the displays 24 would be initially processed (e.g., internal to the display device 12) and then wirelessly transmitted via electronic signals from the display device 12 to the console 36 as needed. To that end, the display device 12 can be equipped to receive static information from the console 36 for exhibiting purposes, and any changes made thereto at the displays 24 of the device 12 can be in turn transmitted to the console 36 and/or the press brake 10. In addition, while wireless communication is primarily discussed with regard to the display device 12 and the console 36, the display device 12 would be configured to communicate with other powered accessories just as well.

As described above, when configured to further function as an "interactive" device, the display device 12 can change the static information being exhibited upon receipt of certain external cues. Such external cues may stem from the operator as described above. However, the invention should not be so limited. Particularly, in cases in which the display device 12 is configured for receiving and transmitting signals, the device 12 may receive signals, with such signals representing alternate types of external cues.

Figure 13:
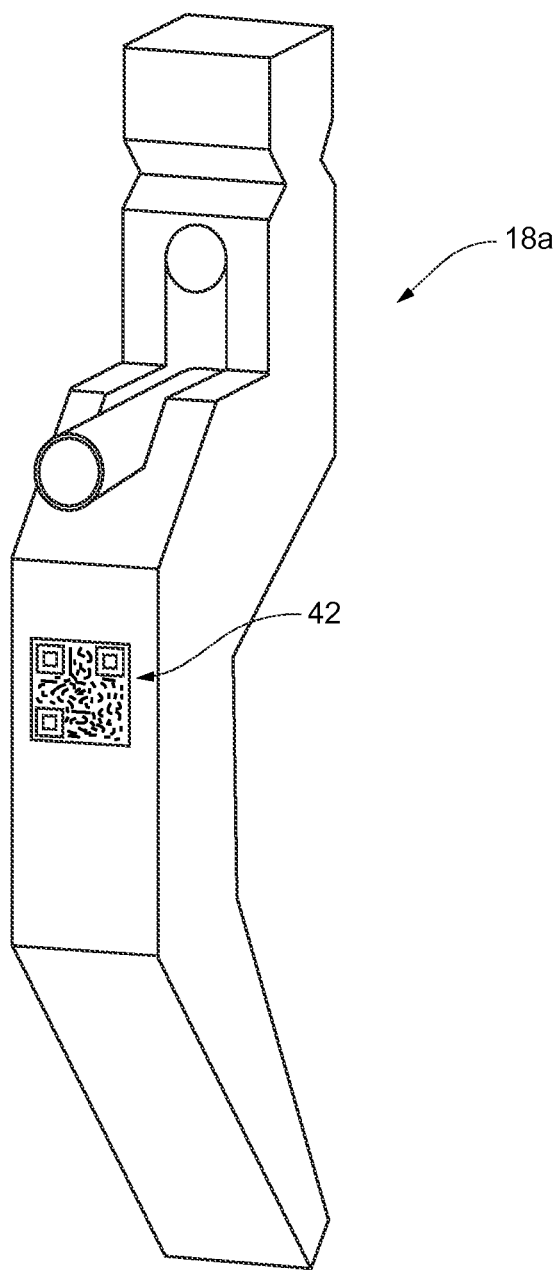
FIG. 13 is a perspective view of an exemplary punch tool in accordance with certain embodiments of the invention.

One example of such signals received by the display device 12 (and representing such external cues) can stem from one or more of the forming tools 18 positioned on the clamping beams 16. FIG. 13 shows a perspective view of an exemplary punch tool 18a in accordance with certain embodiments of the invention. In certain embodiments as shown, such tool 18a has an information tag 42 on an outer surface thereof. While the tag 42 is exemplary shown as a QR code, the tool 18a could alternatively have a bar code, RFID tag, or other like tool identification means which provides a source for information of the tool (e.g., tool ID), with such information being adapted to be queried for assessing such tool information. Tooling that is configured with such electronic information storage devices are known to the art and have been described, for example, with reference to Applicant's U.S. Pat. No. 7,913,533 entitled "Machine Tool Cartridge with Information Storage Device, Smart Storage Systems, and Methods of Using Smart Cartridge Systems," the teachings of which are incorporated herein in relevant part. Given its wireless functionality and transmitting capabilities, the display device 12, in certain embodiments, can query such tools 18a, with corresponding tool information being ascertained by the display device 12. Further, as a consequence of the displays 24 of the device 12 being synched, the information of such tools 18a can be routed to the respective display 24 of the device 12 so as to correspondingly exhibit such information.

The tool information that is queried by the display device 12 and routed to the respective display 24 can include any of a plurality of information. For example, as already described, this information can include one or more of part number 30 (as perhaps best viewed from FIG. 5), part dimensions, and part manufacturer. In certain embodiments, further included in this information is part location. As should be appreciated, using a RFID tag as the tag 42 on the tool 18a can provide specific information concerning the tool's location. This parameter is particularly useful in press brake applications, wherein precise positioning of forming tools 18 on the clamping beams 16 needs to be adhered. To that end, once the tool 18a is positioned on the upper clamping beam 16a and queried by the display device 12, if the location of the tool 18a on the beam 16a is interpreted as being incorrect, such can be conveyed to the operator on the corresponding display 24. In certain embodiments, tool representations 18a', 18b' (as described above with reference to FIG. 5) can be shown as being incorrectly positioned on the corresponding clamping beam extents by using varying (and clearly discernible) color schemes on the displays 24 and/or by producing audible signals and/or voice commands in one of a plurality of different languages, as needed. However, in light of the possible audio capabilities For example, to indicate incorrect tool positioning of the tools 18, the tool representations 18a', 18b' can be shown with black outline, black background, and white lettering, while tools 18 queried and determined to be in their correct positions on the table extents are shown with their tool representations 18a', 18b' shown with black outline, white background, and black lettering. However, it should be appreciated that distinguishing the incorrectly-positioned tools 18 can be exhibited on the displays 24 in any of a wide variety of alternate manners.

Continuing with the above, in cases of the clamps 16 not being activated (i.e., having unclamped status) or the forming tools 14 not properly located on the clamps 16, it has been described that text and/or color with regard to the corresponding clamp and tool representations 16a', 16b' and 18a', 18b' can be used as indicators to the operator. While using both text and color may be considered clear differentiators on the displays 24 of the display device 12, if proper attention is not being paid to the displays 24, there is potential for the operator to miss these improprieties. To address this, in certain embodiments, when any improprieties are discovered by the display device 12 with regard to the deforming operation, the device 12 can be configured to provide an auditory warning to signal the operator. This functionality dictates that the display device 12 be configured with corresponding audio electronics for triggered via discovery of an impropriety by the device 12. The skilled artisan would understand the audio electronics needed, and set-up required, as they are well known in the art. Furthermore, the display device 12, even with its compact size, could accommodate such electronics.

Other examples of such signals received by the display device 12 (and representing such external cues) can stem from one or more of miniature 2D or 3D cameras. For example, in certain embodiments, such cameras 44 can be positioned proximate to or directly on the press brake 10 (to confirm conditions are met to begin the deforming operations, e.g., to check the location of the mounted tools) as exemplarily shown in FIGS. 14A and 14B, and/or at one or more locations around the press brake work area 34 (to confirm no other activity is observed prior to deforming operations being performed) as exemplarily shown in FIG. 12. Given its wireless functionality and transmitting capabilities, the display device 12, in certain embodiments, can receive signals from such cameras 44 to monitor such environment, and transmit signals to the cameras 44 for redirection thereof as desired.

FIG. 15 shows a flowchart of steps of a method in using the display device 12 (or 12') in accordance with certain embodiments of the invention. The method describes steps for the display device 12 during a bending operation involving multiple bending sequences, with such steps possibly being more clearly appreciated with reference to FIG. 5 and/or 17A-17C. To that end, the steps for bending sequences may involve multiple displays 24 of the display device 12 (such as with display device 12 of FIG. 5) or a single display 24 of the display device 12 (such as with display device 12 of FIG. 10). Upon a deforming program being sent to the display device 12 via the console 36, step 50 involves the corresponding display(s) 24 of the device 12 exhibiting the corresponding tool setup thereon. This tool set up is provided via the tool representations 18a', 18b' being shown on the display(s) 24 at their proper positions on the corresponding exhibited extents of the representations of the clamping beams 16a', 16b'. As described above, reference can be made to FIG. 5 (with clamping beam representations 16a', 16b' and forming tool representaitons 18a', 18b' shown across multiple displays 24) and FIGS. 17A-17C (with clamping beam and forming tool representations similarly shown on a single display 24). Once the tools 18 (punches 18a and dies 18b) have been correspondingly positioned on the clamping beams 16 by the operator using the display(s) 24 as a guide, an optional step 52 can involve confirming the positioning of the tools 18 given the use of tools 18 having tags 42 (such as RFID tags, as described above with reference to FIG. 13 or by utilizing the cameras 44, as described with reference to FIGS. 14A and 14B). Such optional step, in certain embodiments, may further include some "Ready" message being conveyed on the display(s) 24 or display tablet 22 indicating that the deforming operation can be started.

Step 54 involves a first deforming sequence being queued to begin (exemplarily represented via the display screen shot of FIG. 17A), wherein the display 24 exhibits corresponding tool representations 18a' 18b' for the first deforming sequence in highlighted form (with darker color shade) with other tool representations 18a', 18b' exhibited in muted form (with lighter color shade). In Step 56 (following the end of the first deforming sequence), a second deforming sequence is queued to begin. Such step involves the display 24 showing the first deforming sequence tool representations 18a' 18b' having been changed to muted form, and the second deforming sequence tool representations 18a' 18b' having been changed to highlighted form (exemplarily represented via the display screen shot of FIG. 17B). It should be understood that such series of muting and highlighting tool representations 18a', 18b' (i.e., steps similar to step 56) will continue until the programmed bending operation is completed. For example, FIG. 17C shows display screen shot of display 24 showing an exemplary third and final deforming sequence of the bending operation, wherein tool representations 18a', 18b' for the third deforming sequence have been changed to highlighted form and the tool representations 18a', 18b' for the second deforming sequence have been changed to muted form. To that end, when the number of deforming sequences steps have been completed for such bending operation, the program will loop back to step 54 until the allotted part run has been completed, or the operator quits the program.

Thus, embodiments of a DISPLAY DEVICE FOR PUNCHING AND PRESSING MACHINES are disclosed. One skilled in the art will appreciate that the invention can be practiced with embodiments other than those disclosed. The disclosed embodiments are presented for purposes of illustration and not limitation, and the invention is limited only by the claims that follow.

What is claimed is:

1. A system for conveying information relating to operations for punching and pressing machines comprising:
   a punching or pressing machine;
   a display device configured to be selectively positioned and used on the machine, the display device having one or more displays having touch screen functionality, the one or more displays configured to exhibit quantitative and qualitative information, the quantitative and qualitative information comprising detail and characteristics involving one or more programmed operations for the machine and tools therefor; and
   a console located remote from the display device, the quantitative and qualitative information provided to the display device via the console;
   wherein the pressing or punching machine comprises a press brake and the one or more displays are configured for selective positioning and attachment on a front surface of the press brake, the one or more displays having an extent similar in length to extents of upper and lower tables of the press brake, the one or more displays having a depth less than depths of either of the upper and lower tables by at least one fourth.

2. The system of claim 1 wherein the one or more displays have a depth equal to the depth of the display device.

3. The system of claim 1 wherein the one or more displays have a depth less than depths of either of the upper and lower tables by at least one half.

4. The system of claim 1 wherein the one or more displays have a depth that permits the display device to be fully recessed in one of the upper and lower tables of the press brake.

5. The system of claim 1 wherein the one or more displays have a depth that permits the display device to be fully recessed in either upper or lower clamping beam of the press brake.

6. The system of claim 1 wherein the one or more displays have a height no greater than the height of either upper or lower clamping beam of the press brake.

7. The system of claim 1 wherein the one or more displays comprise an electronic ink display type having touch screen functionality.

8. The system of claim 1 wherein front portions of the one or more displays define front portions of the display device, the front portions of the display device oriented away from the front surface of the press brake upon attachment of the device to the press brake.

9. The system of claim 1 wherein the one or more displays are housed within one or more segments, each of the one of more assemblies and the one or more displays housed therein forming an assembly.

10. The system of claim 9 wherein each of the one or more segments comprises a c-shaped channel.

11. The system of claim 7 wherein the one or more segments comprises a plurality of segments, at least one of the one or more displays housed within each of the segments, the plurality of segments joined in end-to-end fashion and forming a modular assembly.

12. The system of claim 11 wherein the segments are between approximately 12" and approximately 48" in length.

13. The system of claim 12 wherein the displays are between approximately 12" and approximately 20" in length.

14. The system of claim 1 wherein the one or more displays comprise a plurality of displays, wherein the displays are joined in end-to-end fashion.

15. The system of claim 14 wherein the displays are capable of being electrically linked and synched so as to collectively exhibit extents of clamping beams on the upper and lower tables, the extents corresponding to positions of the displays relative to the beams.

16. A system for conveying information relating to operations for punching and pressing machines comprising:
   a punching or pressing machine;
   a display device configured to be selectively positioned and used on the machine, the display device having one or more displays having touch screen functionality, the one or more displays configured to exhibit quantitative and qualitative information, the quantitative and qualitative information comprising detail and characteristics involving one or more programmed operations for the machine and tools therefor; and
   a console located remote from the display device, the quantitative and qualitative information provided to the display device via the console;
   wherein the pressing or punching machine comprises a press brake and the one or more displays comprises a plurality of displays, the displays being joined in end-to-end fashion and having an extent similar in length to extents of upper and lower tables of the press brake, the displays capable of being electrically linked and synched so as to collectively exhibit extents of clamping beams on the upper and lower tables, the extents corresponding to positions of the displays relative to the beams.

17. The system of claim 16 wherein the displays have a depth less than depths of either of the upper and lower tables by at least one half.

18. The system of claim 16 wherein the one or more displays are housed within one or more segments, each of the one of more assemblies and the one or more displays housed therein forming an assembly.

19. The system of claim 18 wherein the one or more segments comprises a plurality of segments, at least one of the one or more displays housed within each of the segments, the plurality of segments joined in end-to-end fashion and forming a modular assembly.

20. The system of claim 16 wherein the displays are configured to exhibit information concerning the upper and lower clamping beams of the press brake and forming tools to be positioned thereon, the information comprising quantitative and qualitative information for the beams and the tools.

21. The system of claim 20 wherein the qualitative information of the clamping beams and the forming tools comprises corresponding representations of each.

22. The system of claim 21 wherein the qualitative information of the upper and lower clamping beams further comprises clamping status thereof.

23. The system of claim 21 wherein the qualitative information of the forming tools further comprises part number and part manufacturer.

24. The system of claim 20 wherein the quantitative information of the upper and lower clamping beams and the forming tools is correspondingly superimposed on the representations of the upper and lower clamping beams and the forming tools.

25. The system of claim 20 wherein the quantitative information of the upper and lower clamping beams and the forming tools comprises dimensions thereof and proper positions for the forming tools on the upper and lower clamping beams.

26. A system for conveying information relating to operations for punching and pressing machines comprising:
a punching or pressing machine;
a display device configured to be selectively positioned and used on the machine, the display device having one or more displays having touch screen functionality, the one or more displays configured to exhibit quantitative and qualitative information, the quantitative and qualitative information comprising detail and characteristics involving one or more programmed operations for the machine and tools therefor; and
a console located remote from the display device, the quantitative and qualitative information provided to the display device via the console;
wherein the pressing or punching machine comprises a press brake and the one or more displays comprises a plurality of displays and a plurality of segments, at least one of the displays housed within each of the segments, the segments being joined in end-to-end fashion and having an extent similar in length to extents of upper and lower tables of the press brake, the joined segments forming a modular assembly.

27. A system for conveying information relating to operations for punching and pressing machines comprising:
a punching or pressing machine;
a display device configured to be selectively positioned and used on the machine, the display device having one or more displays having touch screen functionality, the one or more displays configured to exhibit quantitative and qualitative information, the quantitative and qualitative information comprising detail and characteristics involving one or more programmed operations for the machine and tools therefor, the details and characteristics further comprising like representations, positions, and locking statuses of the tools; and
a console located remote from the display device, the quantitative and qualitative information provided to the display device via the console;
wherein the one or more programmed operations for the machine and tooling are changeable, such change being triggered via one or more external cues from the operator and comprising finger contacts made with screens of one or more of the displays.

28. The system of claim 27 wherein the punching or pressing machine comprises a press brake.

29. The system of claim 27 wherein the display device is configured for wireless communication with the console, the quantitative and qualitative information stemming from the programmed operations for the machine stored in memory of the console.

30. The system of claim 27 wherein the console comprises a display tablet, the display tablet of a size enabling the tablet for one or more of being readily carried by the operator and being selectively attached to and positioned on the machine.

31. The system of claim 27 wherein additional information pertaining to the one or more programmed operations for the machine and tooling therefor can be accessed via corresponding finger contacts made on screens of one or more of the displays.

32. The system of claim 27 wherein the external cues stem from one or more of the tools.

33. The system of claim 32 wherein the external cues stem from electronic information storage devices provided on the tools.

34. The system of claim 27 wherein the external cues stem from one or more 3D cameras.

35. The system of claim 34 wherein the one or more cameras are mounted proximate to one or more of the upper and lower tables.

36. The system of claim 35 wherein the external cues stem from improprieties proximate to deforming area of the press brake captured by at least one of the cameras.

37. The system of claim 36 wherein the display device is configured to sound an auditory warning in the event of any improprieties.

38. The system of claim 33 wherein the one or more cameras are mounted at locations along a perimeter of work area for the press brake.

39. The system of claim 38 wherein the external cues stem from hand gestures of the operator captured by at least one of the cameras.

40. A method for the display device of the press brake of claim 28 during a bending operation involving multiple deforming operations, the method comprising steps of:
exhibiting a tool set up on one or more displays of the display device, the tool set up corresponding to a specific bending program received by the display device, the exhibited tool set comprising quantitative and qualitative information for upper and lower tables of the press brake and forming tools to be used on the tables for the bending program, the qualitative information comprising corresponding representations of the upper and lower tables and the forming tools, the quantitative information comprising proper positions of the tools on the upper and lower tables;

for a first deforming operation of the specific bending program for a first workpiece, emphasizing the tool representations associated with the first deforming operation and deemphasizing the tool representations not associated with the first deforming operation;

for a second deforming operation of the specific bending program for the first workpiece, deemphasizing the tool representations associated with the first deforming operation and emphasizing the tool representations associated with the second deforming operation;

repeating the deemphasizing and the emphasizing steps with reference to the second deforming operation for any further deforming operations of the specific bending program for the first workpiece; and repeating the emphasizing and deemphasizing steps with regard to the first deforming operation, second deforming operation, and as applicable, further deforming operation(s) for any further workpieces to be made per the bending program.

41. The system of claim 27, wherein the pressing or punching machine comprises a press brake, the display device having an extent similar in length to extents of upper and lower tables of the press brake.

42. The system of claim 27, wherein the pressing or punching machine comprises a press brake, the display device being flush with a front surface of the press brake, whereby a front profile of the press brake remains unchanged.

43. The system of claim 42, wherein the display device is flush relative to an upper table of the press brake.

* * * * *